US012629859B2

(12) United States Patent
Tian et al.

(10) Patent No.: US 12,629,859 B2
(45) Date of Patent: May 19, 2026

(54) ROUTER

(71) Applicant: Nanjing Chervon Industry Co., Ltd., Nanjing (CN)

(72) Inventors: Lei Tian, Nanjing (CN); Jun Le, Nanjing (CN); Liangzhe Wang, Nanjing (CN); Terry Peters, Nanjing (CN); Sherwyn Lamer, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/799,251

(22) Filed: Aug. 9, 2024

(65) Prior Publication Data

US 2024/0399609 A1 Dec. 5, 2024

Related U.S. Application Data

(63) Continuation-in-part of application No. 18/090,153, filed on Dec. 28, 2022, now Pat. No. 12,134,178.

(30) Foreign Application Priority Data

Jan. 28, 2022 (CN) ......................... 202210109123.3
May 9, 2022 (CN) ......................... 202210498792.4
(Continued)

(51) Int. Cl.
*B27C 5/10* (2006.01)

(52) U.S. Cl.
CPC ..................................... *B27C 5/10* (2013.01)

(58) Field of Classification Search
CPC ........................................................ B27C 5/10
See application file for complete search history.

(56) References Cited

U.S. PATENT DOCUMENTS 3,868,831 A * 3/1975 Stock ......................... F16D 1/06
279/55
3,872,951 A * 3/1975 Hastings, Jr. ......... B24B 23/022
408/124
(Continued)

FOREIGN PATENT DOCUMENTS

CN 2841215 Y 11/2006
CN 1317385 A 5/2007
(Continued)

OTHER PUBLICATIONS

Machine translation of CN 101486181.
(Continued)

*Primary Examiner* — Lucas E. A. Palmer
(74) *Attorney, Agent, or Firm* — Greenberg Traurig, LLP

(57) ABSTRACT

A router including a housing provided with an accommodation space, wherein the housing forms or connects to a grip for a user to hold; an electric motor connected to or formed with a drive shaft for outputting power, wherein the drive shaft rotates about a first axis; an external thread located on an outer edge of the drive shaft, wherein the external thread is a M14 thread, the drive shaft can be mated with a power output assembly for connecting a tool bit for cutting operations, the power output assembly includes a chuck and a fastener, the chuck is formed on or connected to the drive shaft, the fastener is threaded with the external thread of the drive shaft, and the tool bit is installed or released to the drive shaft when tightening the fastener to the drive shaft or loosening the fastener from the drive shaft.

20 Claims, 33 Drawing Sheets

(30) Foreign Application Priority Data

May 9, 2022 (CN) ......................... 202210499712.7
May 9, 2022 (CN) ......................... 202221098801.2

(56) References Cited

U.S. PATENT DOCUMENTS

| | | | | |
|---|---|---|---|---|
| 4,122,755 | A * | 10/1978 | Johnson | B23B 31/265 408/238 |
| 4,460,296 | A * | 7/1984 | Sivertson, Jr. | B25B 33/005 408/239 R |
| 4,861,201 | A | 8/1989 | Cuilleron | |
| 5,022,188 | A * | 6/1991 | Borst | B24B 23/022 451/342 |
| 5,423,643 | A * | 6/1995 | Suzuki | B23B 31/113 408/239 R |
| 5,988,241 | A * | 11/1999 | Bosten | B27C 5/10 144/136.95 |
| 7,128,641 | B1 * | 10/2006 | Lin | B24B 23/022 451/357 |
| 2002/0130007 | A1 * | 9/2002 | Nakamura | B25B 21/00 173/217 |
| 2003/0190877 | A1 * | 10/2003 | Gallagher | B24B 55/00 451/344 |
| 2006/0078395 | A1 * | 4/2006 | Cooper | B25F 5/02 409/182 |
| 2006/0102249 | A1 | 5/2006 | Cooper | |
| 2009/0145259 | A1 * | 6/2009 | Wall | B24B 23/022 279/52 |
| 2011/0030984 | A1 * | 2/2011 | Chen | B23B 45/008 408/124 |
| 2012/0317821 | A1 * | 12/2012 | Tsuchiya | A01G 3/053 30/196 |
| 2014/0014385 | A1 * | 1/2014 | Kosugi | B25F 5/02 173/217 |
| 2014/0190017 | A1 * | 7/2014 | Maynez | A01D 34/416 173/217 |
| 2014/0202725 | A1 * | 7/2014 | Johnson | B25F 5/001 173/217 |
| 2014/0349556 | A1 | 11/2014 | Zhang | |
| 2016/0256153 | A1 * | 9/2016 | Shelton, IV | A61B 17/295 |
| 2017/0125192 | A1 * | 5/2017 | Hanai | H01H 21/00 |
| 2019/0015962 | A1 * | 1/2019 | Wang | B25F 5/02 |
| 2021/0237306 | A1 * | 8/2021 | Sigafoose | H02K 11/33 |

FOREIGN PATENT DOCUMENTS

| | | | |
|---|---|---|---|
| CN | 101486181 | A | 7/2009 |
| CN | 201677304 | A | 12/2010 |
| CN | 102765032 | A | 11/2012 |
| CN | 103535201 | A | 1/2014 |
| CN | 104703765 | A | 6/2015 |
| CN | 105437163 | A | 5/2017 |
| CN | 207953760 | U | 10/2018 |
| CN | 212042789 | U | 12/2020 |
| CN | 109909831 | A | 9/2021 |
| DE | 19753304 | A1 | 6/1999 |
| DE | 102014209939 | A1 | 11/2015 |
| EP | 0608083 | B1 | 10/1996 |
| EP | 1661676 | A2 | 5/2006 |
| EP | 2070659 | B1 | 6/2017 |
| JP | 2010201600 | A | 9/2010 |
| JP | 2011098420 | A | 5/2011 |

OTHER PUBLICATIONS

Machine translation of CN 103535201.
Machine translation of CN 104703765.
Machine translation of CN 201677304.
Machine translation of CN 212042789.

* cited by examiner

ROUTER

RELATED APPLICATION INFORMATION

This application is a continuation-in-part of U.S. application Ser. No. 18/090,153, filed on Dec. 28, 2022, which application claims the benefit of CN 202210109123.3 filed on Jan. 28, 2022, CN 202210498792.4 filed on May 9, 2022, CN 202210499712.7 filed on May 9, 2022, and CN 202221098801.2 filed on May 9, 2022, the disclosures of which are incorporated herein by reference in their entireties.

BACKGROUND

In the field of power tools, some handheld power tools are increasingly required by customers to be miniaturized and operated with comfort and ease.

Currently, many handheld power tools such as a router, a wood trimmer, and a die grinder tend to be operated by a user with one or two hands, which places a higher requirement for a compact and wide range of application situations of a power tool. In practical applications, users hope that the chuck of the router can be adapted to as many kinds of tool bits as possible to complete more cutting work.

SUMMARY

A router including a housing provided with an accommodation space, wherein the housing forms or connects to a grip for a user to hold; an electric motor connected to or formed with a drive shaft for outputting power, wherein the drive shaft rotates about a first axis; an external thread located on an outer edge of the drive shaft, wherein the external thread is a M14 thread, the drive shaft can be mated with a power output assembly for connecting a tool bit for cutting operations, the power output assembly includes a chuck and a fastener, the chuck is formed on or connected to the drive shaft, the fastener is threaded with the external thread of the drive shaft, and the tool bit is installed or released to the drive shaft when tightening the fastener to the drive shaft or loosening the fastener from the drive shaft.

In one example, the external thread has a thread pitch of 0.75 mm.

In one example, the lower end of the drive shaft forms a receiving opening, the receiving opening has a section of inclined side wall, the angle between the inclined side wall and the first axis is a first angle α, and the first angle α is greater than or equal to 7.5 degrees and less than or equal to 8.5 degrees.

In one example, the first angle α is 8 degrees.

In one example, the maximum distance from a bottom end of the receiving opening to the inclined side wall is a first length L1, and the first length L1 is greater than or equal to 17 mm.

In one example, the inclined side wall forms a minimum first diameter D1 in a direction perpendicular to the first axis, and the first diameter D1 is greater than or equal to 7.5 mm and less than or equal to 8 mm.

In one example, a lower end of the inclined side wall forms a chamfer, the chamfer is used to make the tool bit easier to insert into the receiving opening, the chamfer forms a maximum second diameter D2 in a direction perpendicular to the first axis, and the second diameter D2 is in the range of (11±0.05) mm.

In one example, a maximum distance of the external thread along the first axis is a second length L2, and the second length L2 is greater than or equal to 10 mm.

In one example, the router further includes a base, the base is used to support the router on a surface of a workpiece to be operated, and the base forms or is connected with the grip.

In one example, the housing forms a power supply connection portion for connecting with a battery pack.

A router includes a housing provided with an accommodation space, wherein the housing forms or connects to a grip for a user to hold; an electric motor connected to or forming a drive shaft for outputting power, wherein the drive shaft rotates around a first axis, and the drive shaft includes an adapting portion to connect a chuck conforming to the ER11 size standard, the chuck being used to clamp a tool bit for cutting operations.

In one example, an external thread is located on an outer edge of the drive shaft, and the external thread is a M14 thread.

In one example, the external thread has a thread pitch of 0.75 mm.

In one example, the lower end of the drive shaft forms a receiving opening, the receiving opening has a section of inclined side wall, the angle between the inclined side wall and the first axis is a first angle α, and the first angle α is greater than or equal to 7.5 degrees and less than or equal to 8.5 degrees.

In one example, the first angle α is 8 degrees.

In one example, the maximum distance from a bottom end of the receiving opening to the inclined side wall is a first length L1, and the first length L1 is greater than or equal to 17 mm.

In one example, the inclined side wall forms a minimum first diameter D1 in a direction perpendicular to the first axis, and the first diameter D1 is greater than or equal to 7.5 mm and less than or equal to 8 mm.

In one example, a lower end of the inclined side wall forms a chamfer, the chamfer is used to make the tool bit easier to insert into the receiving opening, the chamfer forms a maximum second diameter D2 in a direction perpendicular to the first axis, and the second diameter D2 is in the range of (11±0.05) mm.

In one example, a maximum distance of the external thread along the first axis is a second length L2, and the second length L2 is greater than or equal to 10 mm.

In one example, the router further includes a base, the base is used to support the router on a surface of a workpiece to be operated, and the base forms or is connected with the grip.

DETAILED DESCRIPTION

In the description of the present application, unless otherwise expressly specified and limited, the term "connected to each other", "connected", or "fixed" is to be construed in a broad sense, for example, as "fixedly connected", "detachably connected", or "integrated", as "mechanically connected" or "electrically connected", as "directly connected to each other" or "indirectly connected to each other via an intermediary", or as "connected inside two components" or "an interaction relation between two elements". For those of ordinary skill in the art, specific meanings of the preceding terms in the present application may be construed according to specific situations.

In the present application, unless otherwise expressly specified and limited, when a first feature is described as "above" or "below" a second feature, the first feature and the second feature may be in direct contact or may be in contact via another feature between the two features instead of being in direct contact. Moreover, when the first feature is "on", "above", or "over" the second feature, the first feature is right on, above, or over the second feature, the first feature is obliquely on, above, or over the second feature, or the first feature is simply at a higher level than the second feature. When the first feature is "under", "below", or "underneath" the second feature, the first feature is right under, below, or underneath the second feature, the first feature is obliquely under, below, or underneath the second feature, or the first feature is simply at a lower level than the second feature.

Figure 1:
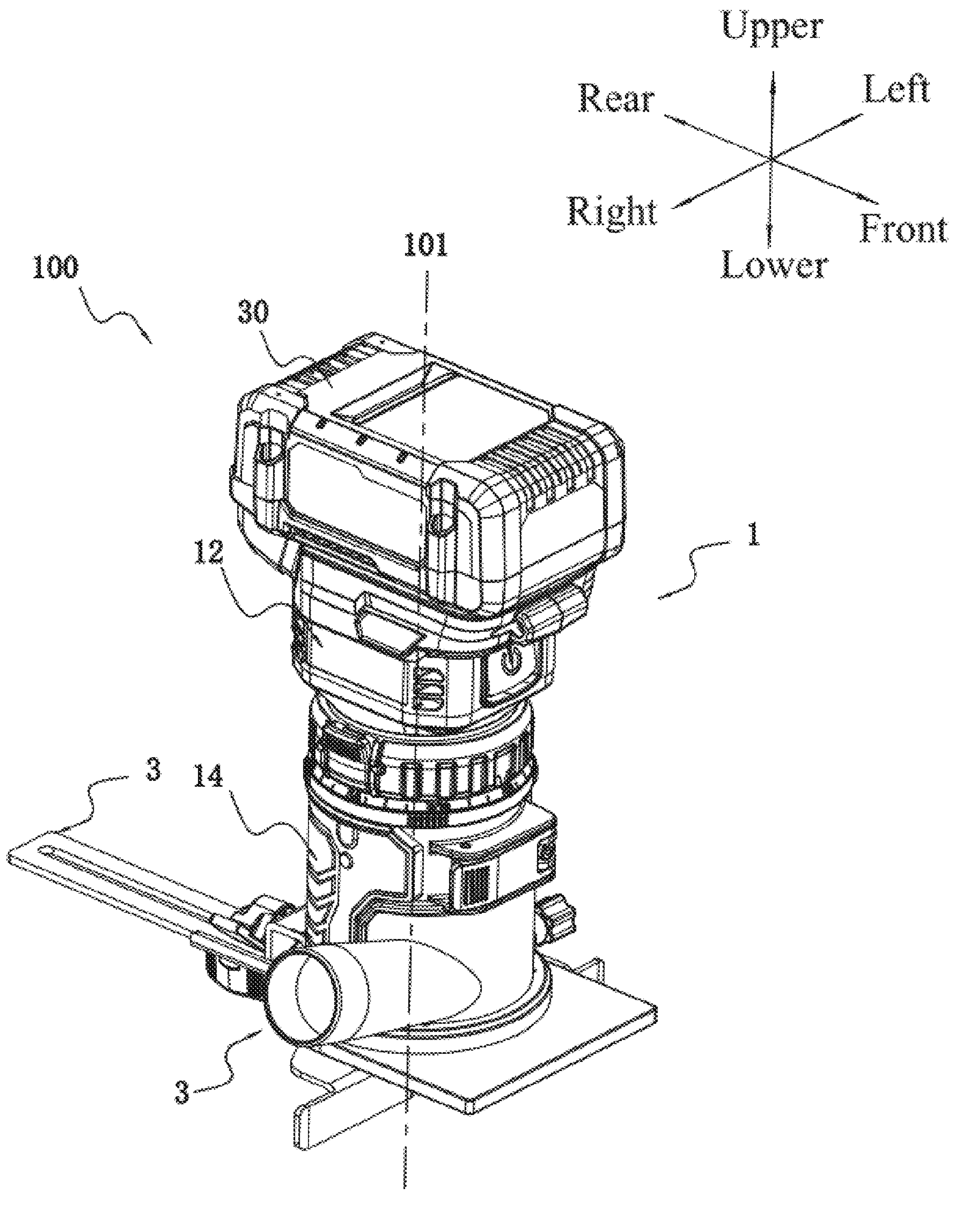
FIG. 1 is a structure view of an example in the present application.
Figure 4:
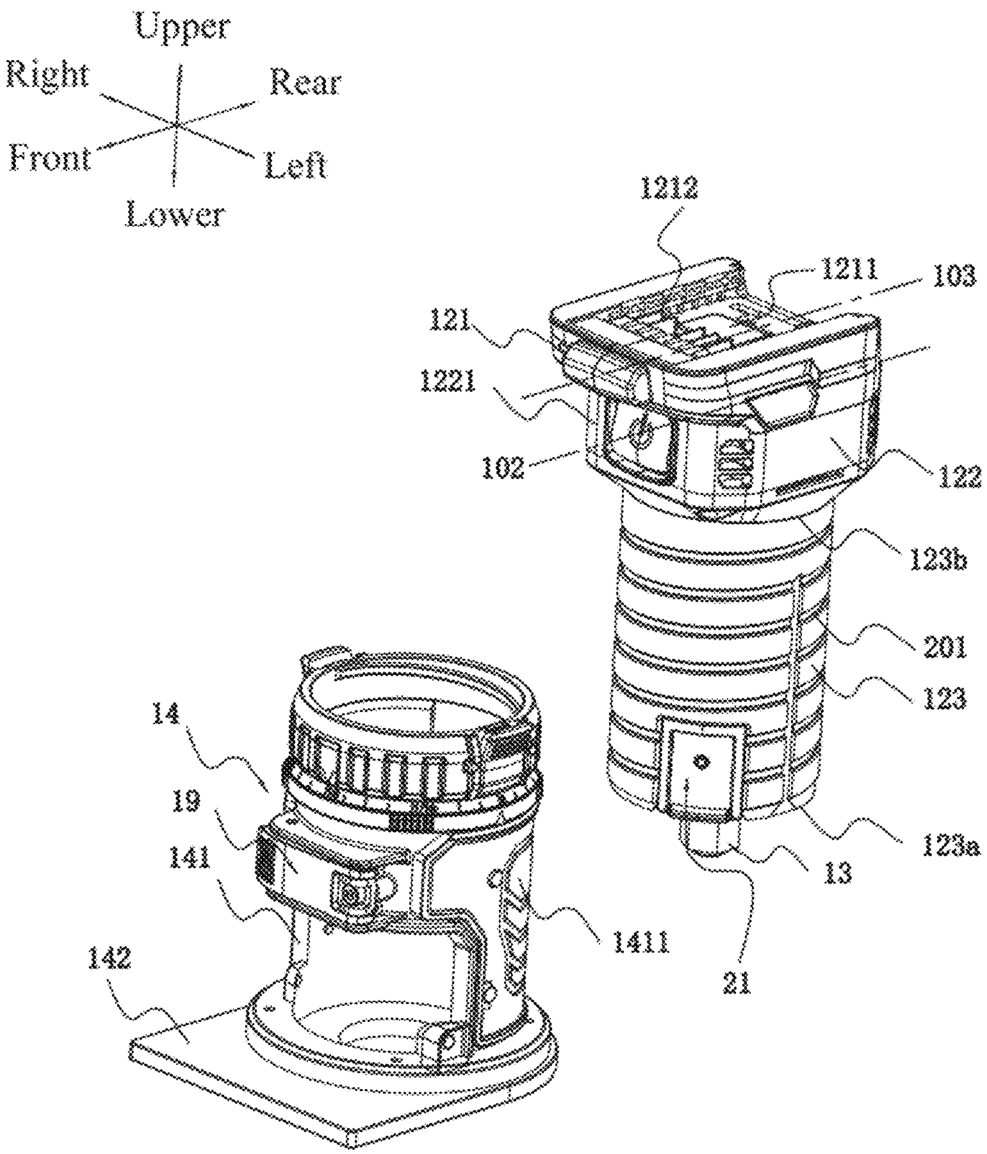
FIG. 4 is an exploded view of the main body of the example in FIG. 3 from another angle of view.

To clearly describe technical solutions of the present application, an upper side, a lower side, a left side, a right side, a front side, and a rear side shown in FIGS. 1 and 4 are further defined.

FIG. 1 shows a power tool in a first example of the present application. The power tool is a router 100. It is to be understood that in other alternative examples, the power tool may be a handheld power tool suitable for being operated with one hand, such as an edge trimmer and another type of router.

Figure 2:
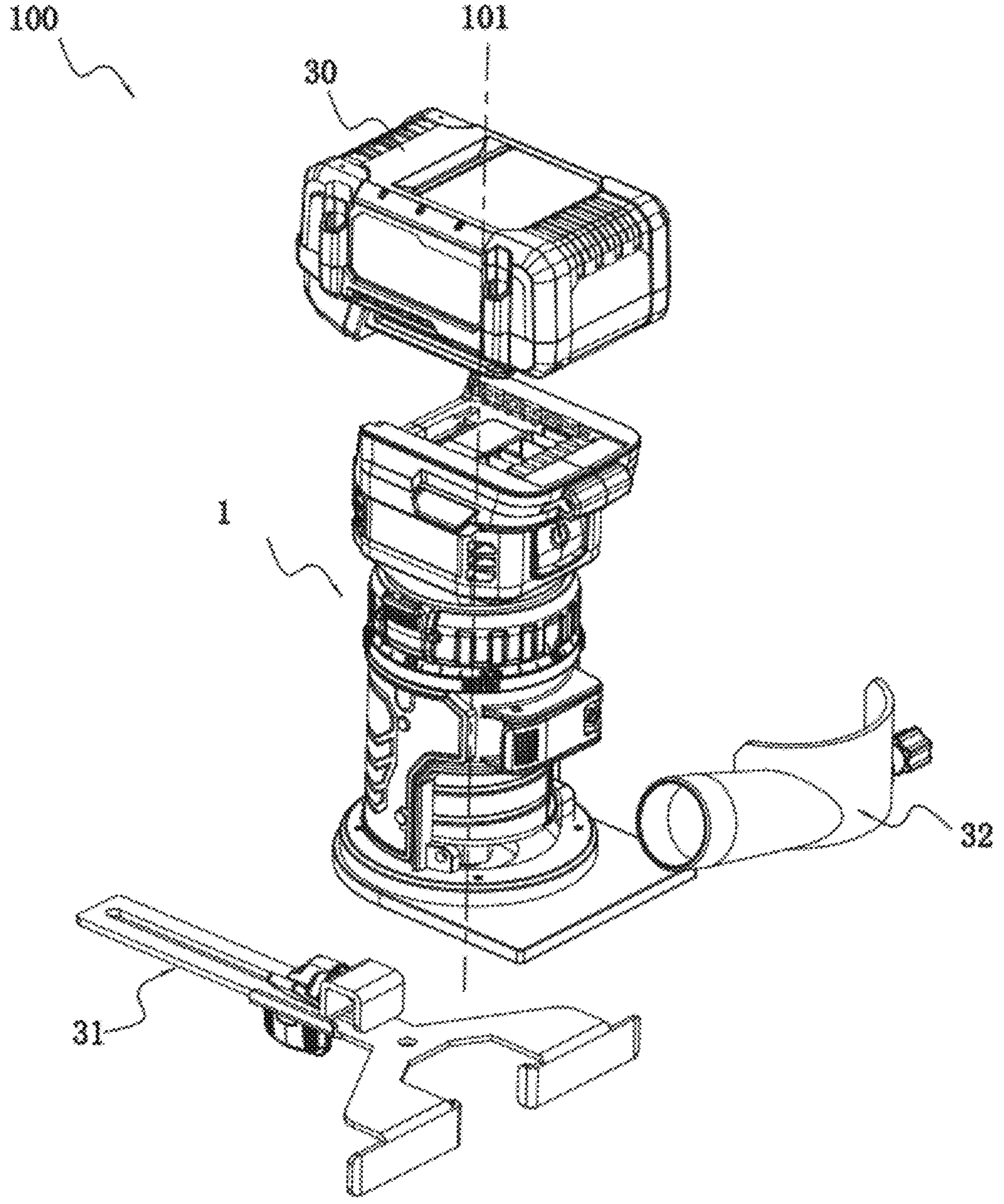
FIG. 2 is an exploded view of a main body, a power supply device, and an accessory of the example in FIG. 1.
Figure 3:
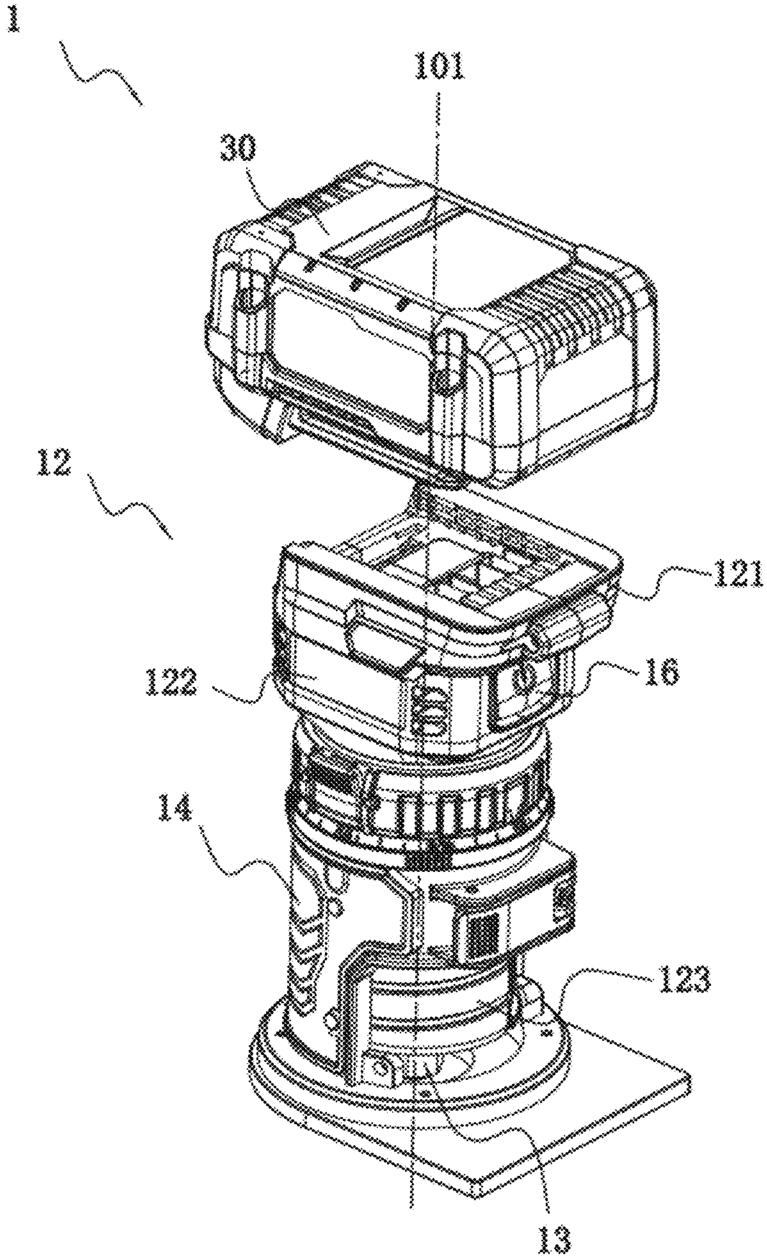
FIG. 3 is an exploded view of a main body and a power supply device of the example in FIG. 1.

FIGS. 1 and 2 show that the router 100 in the first example of the present application includes a power supply device 30, a main body 1, and an accessory 3. The power supply device 30 is used for supplying electrical energy to the main body 1. In this example, the power supply device 30 is a battery pack, and the battery pack cooperates with a corresponding power supply circuit to power corresponding components in the main body 1. It is to be understood by those skilled in the art that the power supply device 30 is not limited to the scenario where the battery pack is used, and the corresponding components in the main body may be powered through mains electricity or an alternating current power supply which cooperates with the corresponding rectifier circuit, filter circuit, and voltage regulation circuit.

As shown in FIGS. 1 to 10, the main body 1 includes an electric motor 11, a housing 12, a power output assembly 13, a base 14, and a control system. The electric motor 11 is formed with or connected to a drive shaft 111 for outputting power. The drive shaft 111 extends along a first axis 101 and rotates relative to the housing 12 about the first axis 101. The drive shaft 111 in this example is formed on a rotor 117 of the electric motor. In other examples, the drive shaft 111 may be another rotation shaft drivingly connected to the rotor 117 of the electric motor.

The control system includes a switch and a controller 18. The switch includes a main switch 15 for controlling the electric motor 11 to start and stop, an operation member 16 to be operated to trigger the main switch 15, and a speed regulation switch 17 for controlling an output rotational speed of the electric motor 11.

In this example, the first axis 101 is an up and down direction, that is to say, the electric motor 11 is vertically disposed along the up and down direction. The rotor 117 of the electric motor is close to an upper portion, and a power output end of the drive shaft 111 is close to a lower portion. The power output assembly 13 is formed at or connected to a lower end of the drive shaft 111. The power output assembly 13 is used for connecting a tool bit (not shown in the figures) such as a milling bit and a saw blade for performing operations on a workpiece. In this example, the power output assembly 13 is configured to include a chuck 131 for connecting the tool bit.

The chuck 131 is connected to or formed at the lower end of the drive shaft 111. The tool bit is detachably fixed to the chuck 131. The electric motor 11 is provided with a fan 1121 above the power output assembly 13, and the fan 1121 is driven by the electric motor 11.

As shown in FIGS. 3 to 6, the housing 12 extends substantially along the first axis 101. In this example, the housing 12 includes a power supply connection portion 121, a connection portion 122, and a main body portion 123 in sequence from top to bottom. The power supply connection portion 121 is used for connecting the power supply device 30. In this example, the power supply device 30 is the battery pack. In the following description, the power supply device 30 is replaced with the battery pack 30, which is not intended to limit the present invention. When the battery pack 30 is mounted to the power supply connection portion 121, an area covered by a projection of the battery pack 30 in a front and rear direction and a left and right direction belongs to the power supply connection portion 121. Specifically, a portion of the housing 12 in a cube formed by outermost edges of the battery pack 30 belongs to the power supply connection portion 121. The connection portion 122 is below the power supply connection portion 121. The control system is disposed in the connection portion 122.

The main body portion 123 is substantially cylindrical and used for supporting the electric motor 11, where the electric motor 11 is at least partially accommodated in the main body portion 123. The main body portion 123 includes a second end **123*b* on the upper side and a first end 123*a* on the lower side, where the second end 123*b* is connected to the connection portion 122, and the first end 123*a* is provided with an opening communicating with the outside, and a portion of the electric motor 11 not accommodated in the main body portion 123 and the power output assembly 13 protrude from the first end 123*a*** of the main body portion to the outside.

As shown in FIGS. 1 to 4, the base 14 is slidably sleeved on an outer side of the main body portion 123 and used for supporting the router 100 on a surface of the workpiece to be operated. In this example, the base 14 includes a baseplate 142 and a sleeve 141 which matches the main body portion 123 in shape. The sleeve 141 covers the outer side of the main body portion 123, and the baseplate 142 is connected to a lower end of the sleeve 141. The housing 12 forms or connects to a grip 1411 for a user to hold. In this example, the sleeve 141 is formed with or connected to a grip 1411 to be gripped by a user. A dimension of the grip 1411 in the up and down direction is not less than the width of a palm of an adult.

As shown in FIGS. 4 to 7, the power supply connection portion 121 includes a coupling portion 1211 coupled to the battery pack 30, and the coupling portion 1211 is further formed with a guide structure 1212 for guiding the battery pack 30 to be coupled to the coupling portion 1211 along a direction of a third straight line 103. The third straight line 103 intersects with the first axis 101. In this example, the third straight line 103 is perpendicular to the first axis 101, that is to say, the battery pack 30 is coupled to the power supply connection portion 121 along a front and rear insertion direction or a left and right insertion direction.

As shown in FIGS. 4 to 10, two ends of the connection portion 122 are separately connected to the power supply connection portion 121 and the main body portion 123, and an accommodation space is disposed in the connection portion 122. The connection portion 122 is provided with a mounting portion 1221 recessed toward the drive shaft 111 along a direction of a second straight line 102, and the mounting portion 1221 is close to the power supply connection portion 121. The operation member 16 is disposed on the mounting portion 1221 and includes a contact surface 161 to be in contact with a finger, where the contact surface 161 is not beyond an outer surface of the mounting portion 1221. The second straight line 102 intersects with the first axis 101.

In this example, the second straight line 102 is substantially perpendicular to the first axis 101. The connection portion 122 and the power supply connection portion 121 form a corner at their connection. Specifically, in the front and rear direction, a sidewall of the connection portion 122 is behind a sidewall of the power supply connection portion 121 on the same side as the sidewall of the connection portion 122. Here, the sidewall of the connection portion 122 is the mounting portion 1221 which is closer to the drive shaft 111 of the electric motor 11 than the sidewall of the power supply connection portion 121. The operation member 16 is disposed on the mounting portion 1221, and the contact surface 161 of the operation member 16 is configured to face outward from the mounting portion 1221. The recessed mounting portion 1221 is provided so that the operation member 16 is in a protected region, thereby preventing the operation member 16 from being touched by an external force in an operation process, effectively preventing the operation member 16 from being falsely triggered, and improving safety. In addition, the mounting portion 1221 and the power supply connection portion 121 form a corner structure so that the user can find the position of the operation member 16 more conveniently.

The main switch 15 is a switch with a relatively short stroke, such as a microswitch or a membrane switch so that the volume of the whole power tool can be reduced. In this example, the operation member 16 is pressed such that the main switch 15 is triggered. Specifically, the operation member 16 further includes a trigger portion 162 and a reset element 163. The trigger portion 162 and the reset element 163 are connected to a trigger point of the main switch 15. The operation member 16 moves between an extended position and a retracted position relative to the mounting portion 1221. In this example, the operation member 16 is rotatably connected to the connection portion 122. In other examples, the operation member 16 may be slidably connected to the connection portion 122 or connected to the connection portion 122 in other manners. An initial state refers to that when the user does not operate the operation member 16, the operation member 16 is in the extended position and the trigger point of the main switch 15 is not triggered. When the user applies an external force to the contact surface 161 to move the operation member 16 to the retracted position, the trigger point is pressed by the trigger portion 162 such that the main switch 15 is triggered and the reset element 163 starts to be compressed to store energy. After the user stops applying the external force to the contact surface 161, the reset element 163 releases the energy to reset the position of the operation member 16 to the initial state, that is, the operation member 16 is reset to the extended position. In this case, the main switch 15 is still kept in the triggered state. When the user applies an external force to the contact surface 161 again to move the operation member 16 to the retracted position and the trigger point is pressed by the trigger portion 162 again, a state of the main switch 15 is changed and an on or off state is changed. The manner of using the operation member 16 is more straightforward. In this manner, the manner of using the operation member 16 does not need to be adjusted according to the state of the main switch 15. For example, a direction toward which a rocker switch is pressed or toggled needs to be adjusted according to the state of the main switch. The manner of using the operation member 16 more accords with ergonomics.

The router 100 has a central plane. A dimension of the contact surface 161 in a width direction perpendicular to the central plane is L2, a dimension of the mounting portion 1221 in the width direction is L1, and a ratio of L2 to L1 is greater than or equal to 0.35 and less than or equal to 1. The operation member 16 has a larger area to be operated by the user so that it is easier for the user to touch the contact surface 161 of the operation member 16 accurately when operating the operation member 16.

As shown in FIGS. 7 to 10, the main switch 15, the controller 18, and the speed regulation switch 17 are all disposed in the connection portion 122. The speed regulation switch 17 includes an adjustment knob 171 which is partially disposed outside the connection portion 122 to be operated by the user. Specifically, the speed regulation switch 17 and the main switch 15 are disposed above the controller 18, and the electric motor 11 is disposed below the controller 18. In this manner, the whole power tool has a more compact structure and the arrangement of wires is facilitated. In this example, the speed regulation switch 17 and the main switch 15 are disposed on two sides of the controller 18 separately.

The controller 18 includes a circuit board 181 and a heat dissipation component 183 surrounding the circuit board 181. In this example, the heat dissipation component 183 is a heat board. In a direction perpendicular to the first axis 101, the main switch 15 at least partially overlaps the heat dissipation component 183, and the speed regulation switch 17 at least partially overlaps the heat dissipation component 183. That is to say, a straight line extending in the up and down direction at least exists which passes through both the main switch 15 and the heat dissipation component 183, and a straight line extending in the up and down direction at least exists which passes through both the speed regulation switch 17 and the heat dissipation component 183. The area of the heat dissipation component 183 is increased, and in this example, dimensions of the heat dissipation component 183 are substantially the same as internal dimensions of the connection portion 122.

Air inlets 1222 and 1223 are disposed on the connection portion 122, and the air inlets 1222 and 1223 communicate with the inside and outside of the connection portion 122. In addition, the connection portion 122 is configured to communicate with the main body portion 123, that is to say, air entering the connection portion 122 through the air inlets 1222 and 1223 may flow into the main body portion 123. The air inlets 1222 and 1223 are configured to surround the connection portion 122. When the electric motor 11 drives the fan 1121 to rotate, heat dissipation air paths can be formed which flow in from the air inlets 1222 and 1223, sequentially flow through the switch and the controller 18 to the electric motor 11, and flow out from the main body portion 123. Specifically, the air inlets include a first air inlet 1222 extending along an axial direction of the connection portion 122 and a second air inlet 1223 extending along a circumferential direction of the connection portion 122. In this example, multiple first air inlets 1222 are equally spaced apart along the circumferential direction of the connection portion 122. When the electric motor 11 drives the fan 1121 to rotate, a first heat dissipation air path can be formed which flows in from the first air inlet 1222, sequentially flows through the switch and the controller 18 to the electric motor 11, and flows out from the main body portion 123. Multiple second air inlets 1223 are equally spaced apart along the circumferential direction of the connection portion 122. Specifically, the second air inlets 1223 are aligned with the heat dissipation component 183. When the electric motor 11 drives the fan 1121 to rotate, a second heat dissipation air path can be formed which flows in from the second air inlet 1223, sequentially flows through the controller 18 to the electric motor 11, and flows out from the main body portion 123. With the first heat dissipation air path, air generated by the fan 1121 can cool the switch (including the main switch 15 and the speed regulation switch 17), the heat dissipation component 183, and the electric motor 11 sequentially, and finally, the air is discharged to the outside through the opening of the main body portion 123. With the second heat dissipation air path, the air generated by the fan 1121 can cool the heat dissipation component 183 and the electric motor 11 sequentially, and finally, the air is discharged to the outside through the opening of the main body portion 123.

The heat dissipation performance of the circuit board 181 affects the working performance of the router 100 during the use of the router 100. Therefore, heat of the circuit board 181 is dissipated through multiple air paths and the dimensions of the heat dissipation component 183 are increased so as to improve heat dissipation efficiency, which is conducive to the heat dissipation of the circuit board 181 and thus improves the working performance of the router 100. In this example, with a 24 V battery pack, the router 100 can continuously run for at least 15 minutes at a current of 50 A.

Figure 5:
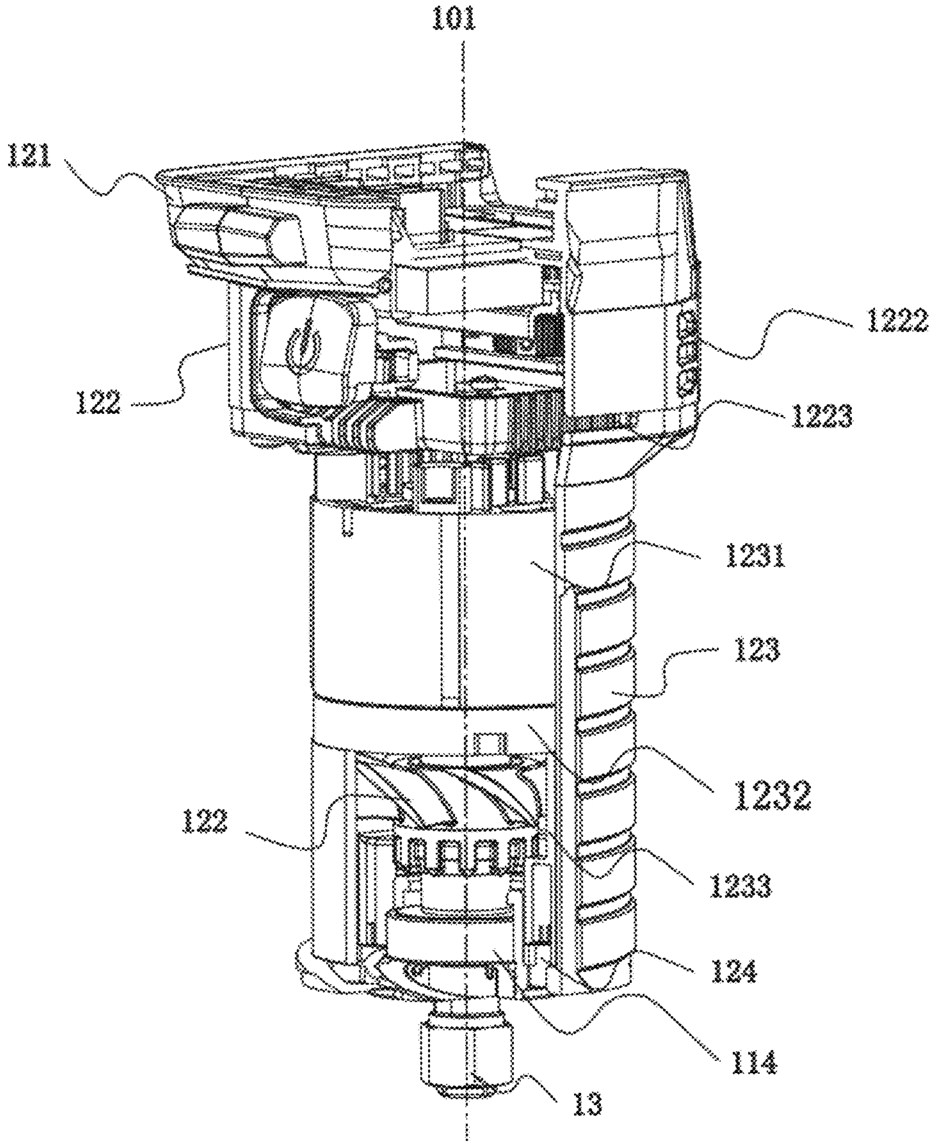
FIG. 5 is a view showing an internal structure of the main body of the example in FIG. 3 with a base removed.
Figure 6:
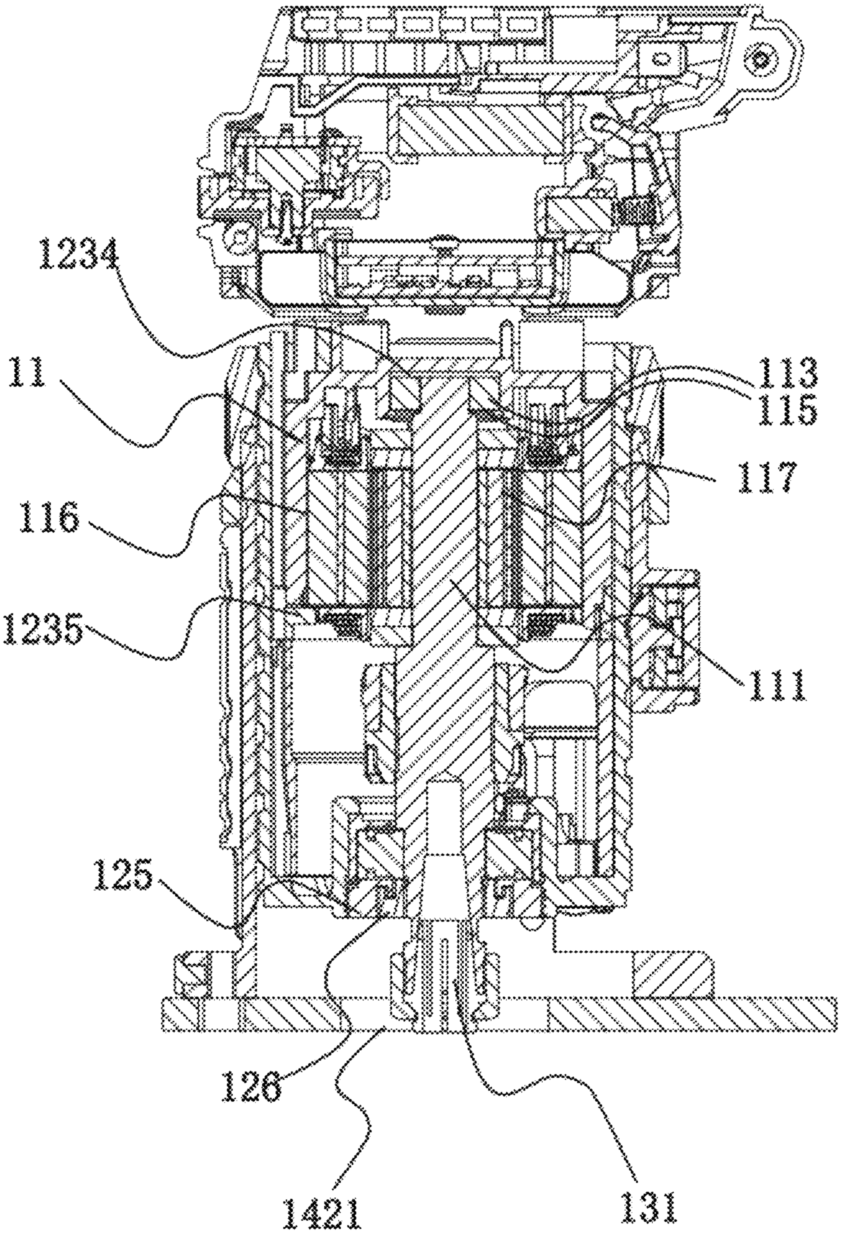
FIG. 6 is a sectional view of the main body of the example in FIG. 3.
Figure 7:
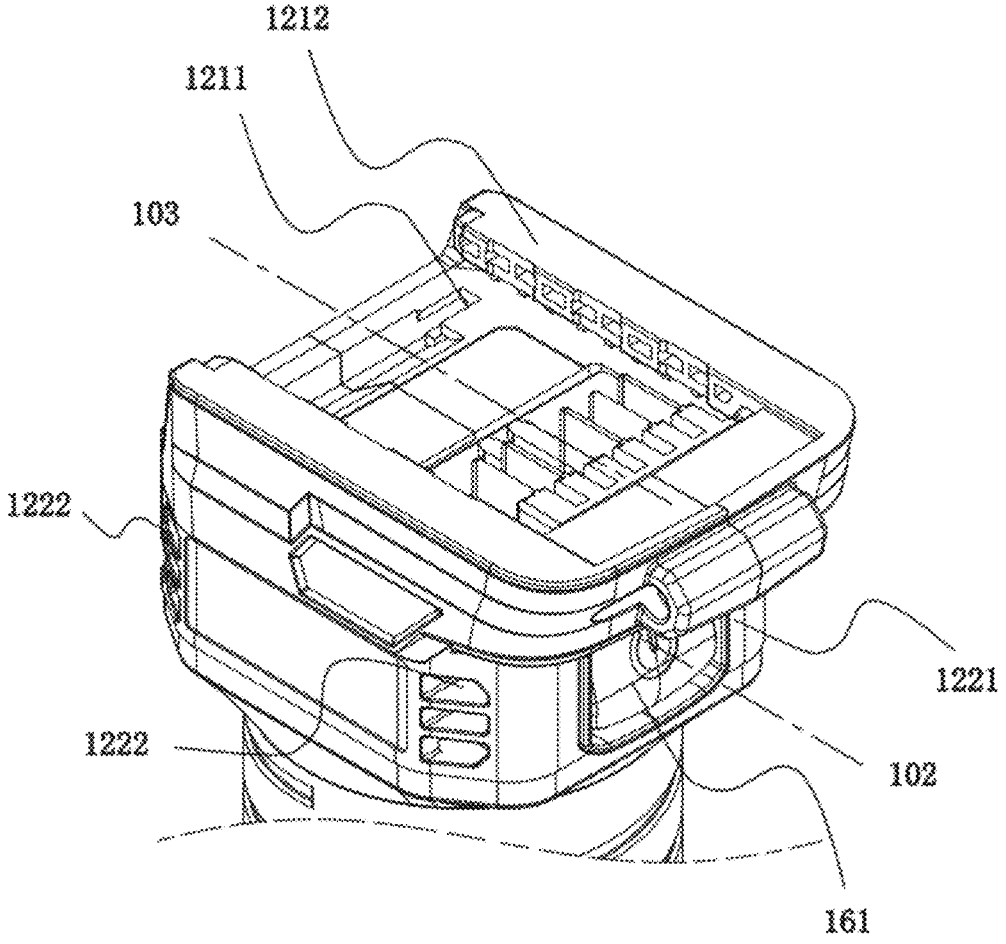
FIG. 7 is a partial enlarged view of FIG. 4 from another angle of view, which shows a power supply connection portion and a connection portion.
Figure 8:
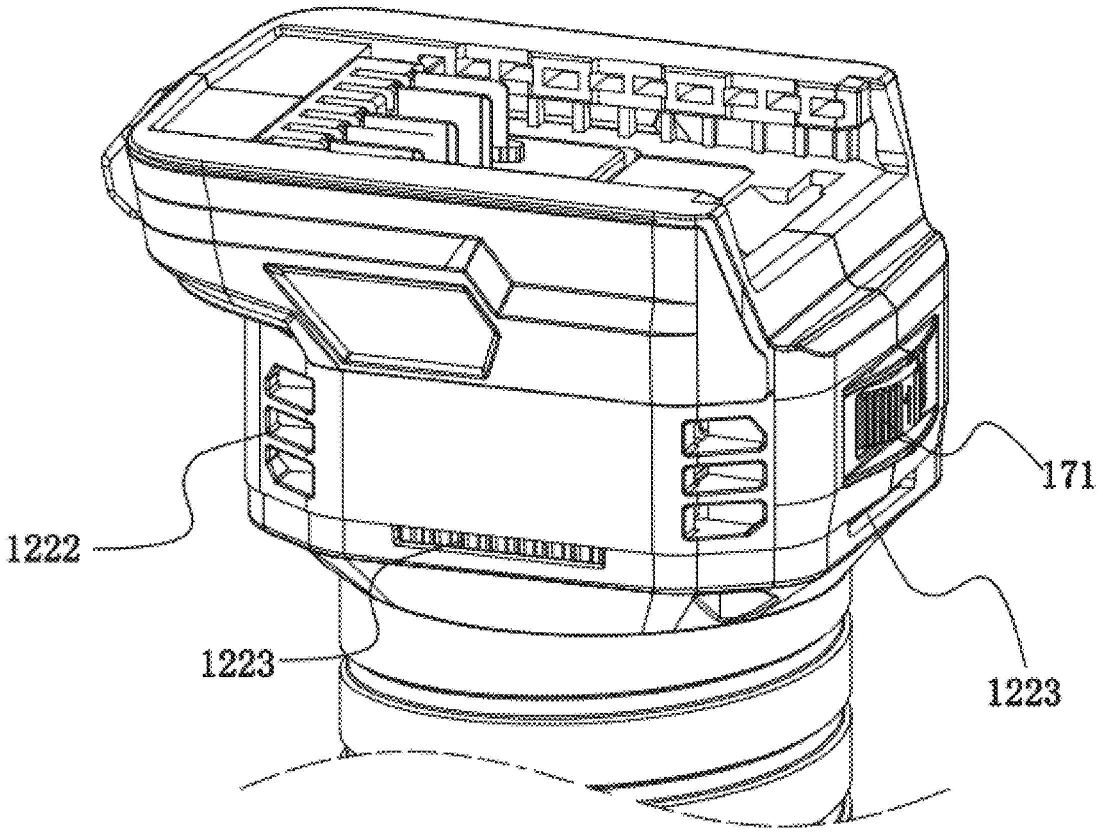
FIG. 8 is a structure view of FIG. 7 from another angle of view.
Figure 9:
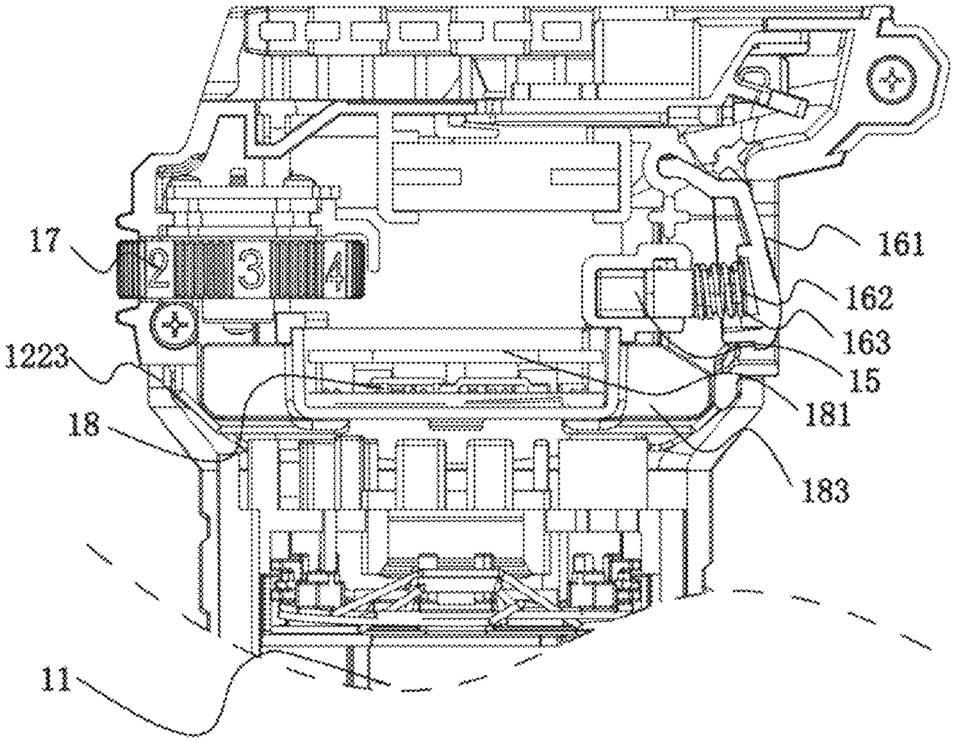
FIG. 9 is a view showing an internal structure of FIGS. 7 and 8.
Figure 10:
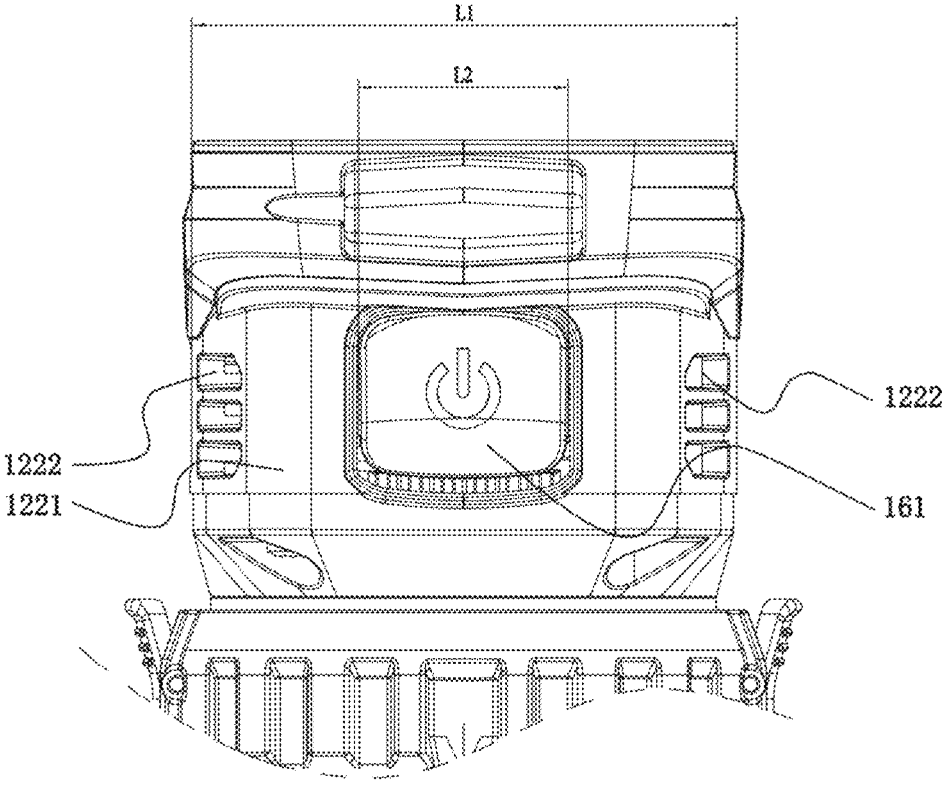
FIG. 10 is a plan view of FIG. 7 from another angle of view.

As shown in FIGS. 5 and 6, the main body portion 123 includes electric motor housings 1231, 1232, and 1233 where the electric motor 11 is mounted by the user. An accommodation cavity is disposed inside the electric motor housings 1231, 1232, and 1233, and the electric motor housings 1231, 1232, and 1233 are detachably connected inside the main body portion 123. The electric motor housings include a first housing 1231, a second housing 1232, and a third housing 1233 which are sequentially arranged from top to bottom. Each of the first housing 1231, the second housing 1232, and the third housing 1233 is a cylindrical integral structure. A bearing mounting portion 1234 is disposed inside the first housing 1231 and used for mounting a first bearing 113 of the electric motor 11. Specifically, the rotor 117 of the electric motor is coaxially sleeved in a stator 116, that is to say, the electric motor 11 is an inrunner. The drive shaft 111 passes through the rotor 117 and two ends of the drive shaft 111 are each configured to be beyond an end face of the rotor 117, and the first bearing 113 for support is disposed on a portion of an upper end of the drive shaft 111 beyond an upper end face of the rotor 117. A portion of a lower end of the drive shaft 111 beyond a lower end face of the rotor 117 is connected to the fan 1121 and the power output assembly 13 and provided with a second bearing 114 for support. A slot-like bearing mounting portion 1234 is formed in the first housing 1231, an outer ring of the first bearing 113 abuts against the bearing mounting portion 1234, an inner ring of the first bearing 113 is connected to the drive shaft 111, and a dust-proof gasket 115 is disposed at a lower end of the first bearing 113 to prevent powder from entering the bearing and affecting the service life of the bearing. The second housing 1232 is connected to a lower end of the first housing 1231, where the second housing 1232 includes a first positioning portion 1235 abutting against the stator 116. Specifically, after the second housing 1232 is connected to the first housing 1231, the first positioning portion 1235 abuts against a lower end face of the stator 116. An upper end of the third housing 1233 is connected to a lower end of the second housing 1232, and a lower end of the third housing 1233 is connected to an illumination mechanism 124. The illumination mechanism 124 projects light onto the workpiece through a light-transmissive hole or a transparent portion of the base 14. The third housing 1233 is connected to the main body portion 123.

The second bearing 114 is disposed in the main body portion 123. Specifically, the second bearing 114 is kept in the main body portion 123 by a first ring 125 and a second ring 126 which are engaged with each other. The first ring 125 is connected to the drive shaft 111, the second ring 126 is connected to the main body portion 123, and the first ring 125 is connected to the second ring 126 through a labyrinth groove structure. In this example, the first ring 125 is in a threaded connection to the drive shaft 111, the second ring 126 is in a threaded connection to the main body portion 123, and the first ring 125 and the second ring 126 abut against a lower end of the second bearing 114. A dust-proof gasket 115 is disposed at an upper end of the second bearing 114. The labyrinth groove and the dust-proof gasket 115 are used to prevent powder from entering the bearing and affecting the service life of the bearing.

As shown in FIGS. 3 and 10 to 16, the main body 1 further includes a first locking mechanism 21 which includes a shaft locking assembly 211. The shaft locking assembly 211 includes a first state where the chuck 131 is restrained from rotating and a second state where the chuck 131 is released to rotate. In this example, the drive shaft 111 is formed with the chuck 131. It is to be understood that the shaft locking assembly 211 may enter the first state and the second state directly by restraining the drive shaft 111 from rotating about the first axis 101 and releasing the drive shaft 111 to rotate about the first axis 101.

The first locking mechanism 21 further includes a first operation assembly 212 and a first locking assembly 213. The first operation assembly 212 is at least partially disposed on an outside of the housing 12 to be operated by the user, so as to cause the shaft locking assembly 211 to switch between the first state and the second state. In this example, the first operation assembly 212 includes a first push portion 2121, where the first push portion 2121 partially extends to the outside of the housing 12, and the first push portion 2121 is slidably connected to the housing. The user directly pushes the first push portion 2121 to switch the shaft locking assembly 211 into the first state or the second state. When the first operation assembly 212 is triggered to cause the shaft locking assembly 211 to be in the first state, the first locking assembly 213 locks the shaft locking assembly 211, and when the first operation assembly 212 is triggered again, the first locking assembly 213 allows the shaft locking assembly 211 to switch from the first state to the second state. Thus, when detaching the tool bit, the user does not need to keep operating the first operation assembly of the first locking mechanism with one hand all the time, thereby improving the user experience of the power tool. In addition, the tool bit is replaced with two hands at the same time so that the operation is safer.

The shaft locking assembly 211 includes a first shaft locking member **211*a* and a second shaft locking member 211*b*. In this example, the first shaft locking member 211*a* includes a shaft locking disc 2111 formed on or connected to the drive shaft 111. The shaft locking disc 2111 and the drive shaft 111 form a whole which rotates about the first axis 101. In other alternative examples, the shaft locking disc is formed on or connected to the chuck. Multiple locking portions 2112 are disposed on an outer peripheral surface of the shaft locking disc 2111. The second shaft locking member 211*b* includes a shaft locking rod 2113, and the shaft locking rod 2113 is formed with or connected to an execution portion 2114. The execution portion 2114 is optionally engaged with at least one locking portion 2112. The execution portion 2114 and the at least one locking portion 2112 are engaged with each other such that the shaft locking assembly 211 is in the first state. The shaft locking rod 2113 is driven by the operation assembly. Specifically, one end of the shaft locking rod 2113 is connected to the first push portion 2121, and the other end of the shaft locking rod 2113 is provided with the execution portion 2114. In this example, the shaft locking rod 2113 is formed with the execution portion 2114. In other alternative examples, the execution portion 2114 is connected to the shaft locking rod 2113**.

The first locking assembly **213*a* includes a first locking member 213*a* disposed on the first push portion 2121 and a second locking member 213*b* disposed on the housing 12. When the shaft locking assembly 211 is in the first state, the first locking member 213 and the second locking member 213*b* lock each other. Thus, when the user stops applying a force to the first push portion 2121, the first push portion 2121 is still kept in the position when the shaft locking assembly 211 is in the first state, that is to say, the execution portion 2114 still keeps engaged with the at least one locking portion 2112**.

In this example, the first push portion 2121 is inserted into a sliding chute portion 214 of the housing 12 and slides along a direction parallel to the first axis 101. The first locking member 213 is disposed on two sides of the first push portion 2121 and includes a first snap 2131 and a resilient portion 2132. The second locking member **213*b* is disposed in the sliding chute portion 214 and includes a second snap 2133. The second snap 2133 and the first snap 2131 are configured to be engaged with each other. When the first snap 2131 interferes with the second snap 2133 through the resilient portion 2132, the resilient portion 2132 is compressed by the first snap 2131 to move away from the second snap 2133. After the first snap 2131 moves past the second snap 2133, the resilient portion 2132 is reset and the first snap 2131 and the second snap 2133** are engaged with each other or disengaged from each other.

The electric motor includes a blocking protection system. When the electric motor is started by the main switch and the shaft locking assembly 211 is still in the first state, the blocking protection system powers off the electric motor. That is to say, when the execution portion 2114 still keeps engaged with the at least one locking portion 2112 such that the drive shaft 111 is restrained from rotating, if the main switch is started such that the battery pack powers the electric motor to start the electric motor to cause the rotation of the drive shaft 111, the blocking protection system is started, the power supply from the battery pack to the electric motor is cut off, the electric motor will not be started, and the drive shaft 111 will not rotate. Thus, the electric motor is protected from being damaged.

The blocking protection system includes a detection mechanism and a first control mechanism, where the detection mechanism is used for detecting a state of the shaft locking assembly 211. The first control mechanism is disposed on the circuit board. In this example, the first control mechanism is a microcontroller unit (MCU). According to the state of the shaft locking assembly 211 detected by the detection mechanism, the first control mechanism determines whether the power supply of the electric motor to be cut off.

The blocking protection system further includes an alarm mechanism at least partially disposed outside the housing and used for reminding the user that the blocking protection system of the electric motor is on. The alarm mechanism includes, but is not limited to, a buzzer alarm, a warning light, or another human-machine interface display.

Figure 11:
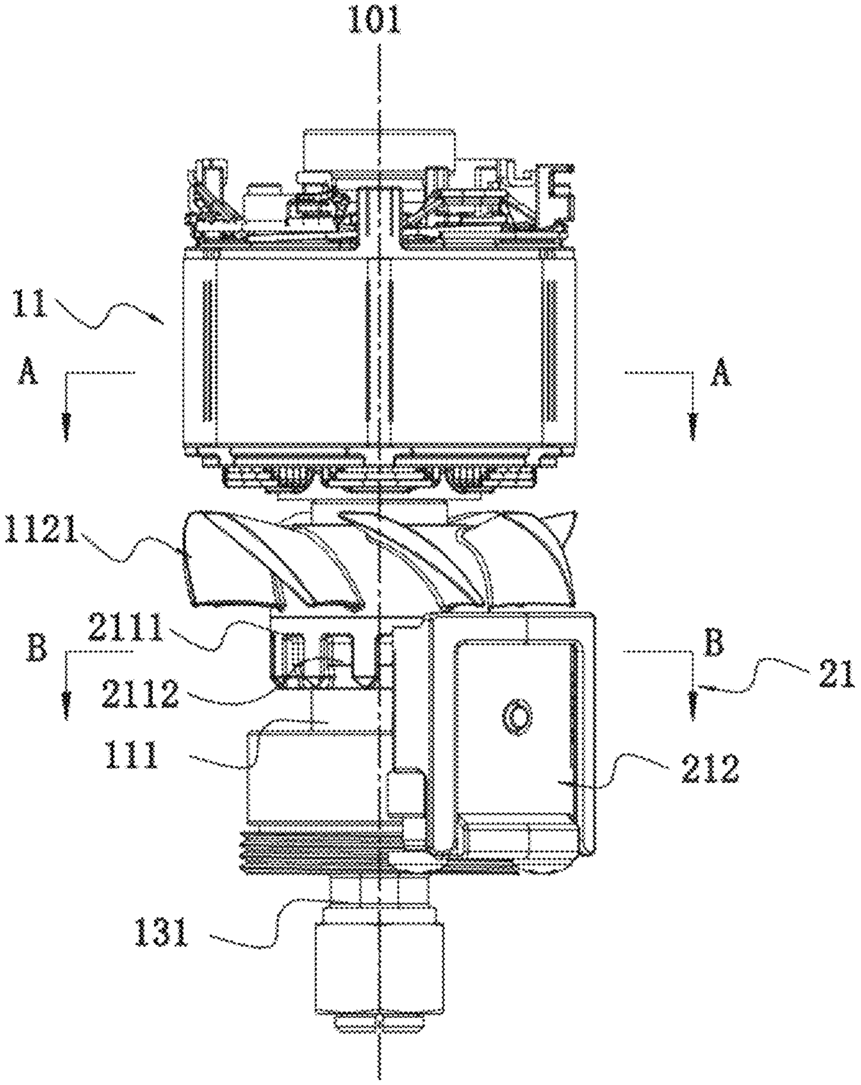
FIG. 11 is a structure view of some components in the main body in FIG. 4, which shows an electric motor, a first locking mechanism, and a chuck.
Figure 12:
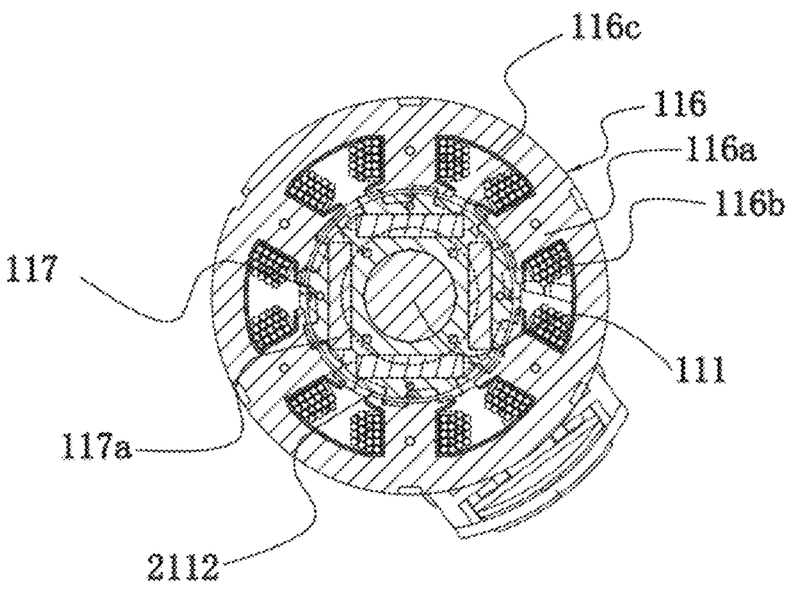
FIG. 12 is a cross-sectional view taken along A-A in FIG. 11.
Figure 13:
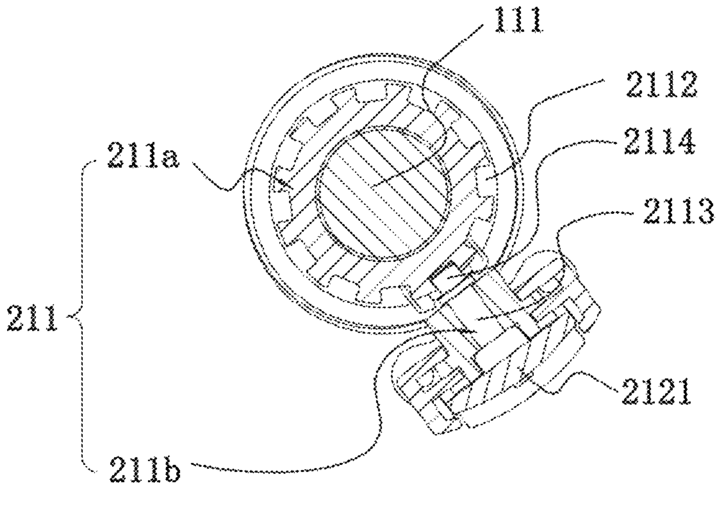
FIG. 13 is a cross-sectional view taken along B-B in FIG. 11.
Figure 14:
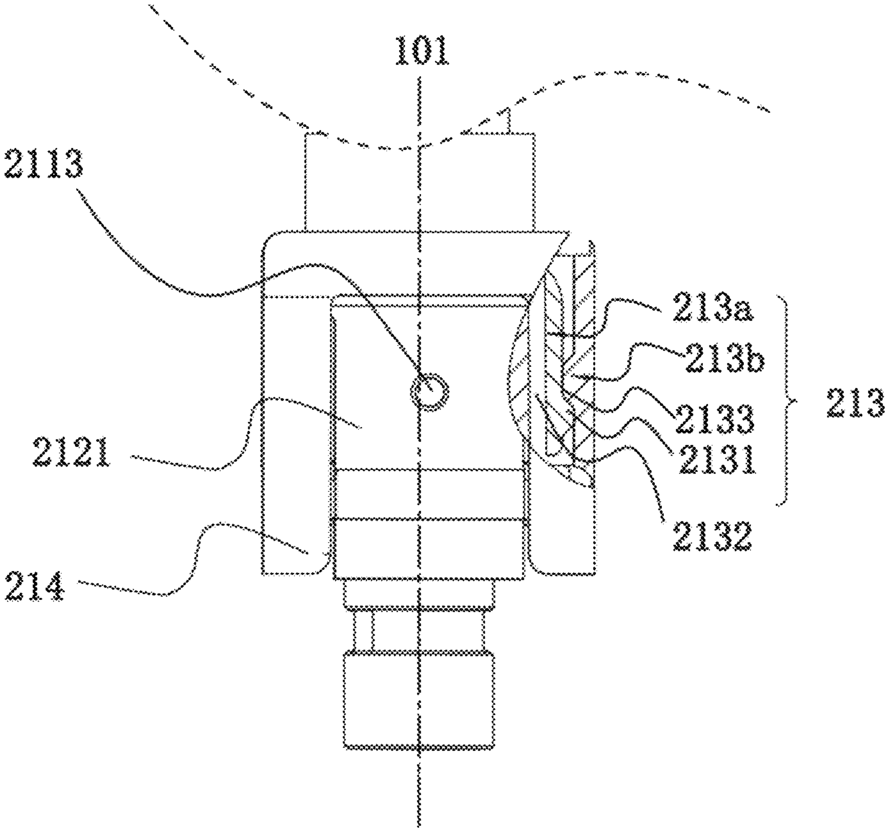
FIG. 14 is a structure view of the components in FIG. 11 from another angle of view, which shows a first locking assembly.

As shown in FIGS. 11 to 13, the multiple locking portions 2112 are disposed on the shaft locking disc 2111. In other alternative examples, the multiple locking portions 2112 may be directly disposed on the drive shaft 111. When the execution portion 2114 moves to a first position, the execution portion 2114 and the at least one locking portion 2112 are engaged with each other such that the shaft locking assembly 211 is in the first state. The electric motor includes a stop state where the chuck stops rotating and a running state where the chuck drives the tool bit to work. When the electric motor enters the stop state, the first position is in the at least one locking portion 2112. Thus, each time the electric motor is stopped, the execution portion 2114 can be aligned with the locking portion 2112. In this manner, the shaft locking assembly 211 can enter the first state very smoothly. It is to be understood that when the electric motor is stopped, the execution portion 2114 is driven only by the first operation assembly 212. Since the at least one locking portion 2112 is in the first position, the locking portion 2112 does not need to be adjusted. When the execution portion 2114 moves to the first position, the execution portion 2114 can be engaged with the locking portion 2112.

It is to be understood that the execution portion 2114 can be aligned with the locking portion 2112. In this example, the execution portion 2114 moves along the direction parallel to the first axis 101 and can be aligned with the locking portion 2112, that is to say, the locking portion 2112 is aligned with the execution portion 2114 in a direction of the first axis 101. In other alternative examples, when the execution portion 2114 moves in another manner or another direction, that is, when the execution portion 2114 is engaged with or disengaged from the locking portion 2112 in another manner or another direction, the locking portion 2112 is in a movement path of the execution portion 2114.

In this example, the stator 116 includes a stator core 116*a* and a stator winding 116*b*, and a number N of slots 116*c* are provided on the stator core 116*a*. That is, N is the number of slots of the electric motor. The rotor 117 includes permanent magnets 117*a* for generating a magnetic field, and the number of magnetic poles of a magnetic field of the stator 116 is M. That is, M is the number of poles of the electric motor. It is known from the related art that a non-powered permanent magnet motor has a periodic torque because its rotor 117 and stator 116 tend to be self-adjusted to a position with a minimum reluctance, that is, a cogging torque. The cogging torque is a tangential component of a force between the magnetic field of the permanent magnets 117*a* and the stator slots. The cogging torque always attempts to locate the rotor 117 in a certain position. Because of the cogging torque of the electric motor, the rotor 117 of the electric motor has a fixed stop position. That is to say, the number of stop positions of any point on an outer sidewall of the shaft of the electric motor corresponds to the number of cogging torques per rotation of the rotor 117. The number of stop positions is less than or equal to the number of cogging torques per rotation of the rotor 117. Therefore, when the slots 116*c* of the stator core 116*a* and the permanent magnets 117*a* of the rotor 117 are uniformly disposed about the first axis 101, the stop positions are also uniformly disposed about the first axis 101. Therefore, a correspondence between the number of locking portions 2112 and the number of cogging torques per rotation of the rotor 117 is established so that each time the electric motor is stopped, the execution portion 2114 can be aligned with at least one of the multiple locking portions 2112. It is known from the related art that the number of cogging torques per rotation of the rotor 117 is a least common multiple of the number M of poles and the number N of slots. The least common multiple of the number M of poles and the number N of slots is set to C. Therefore, a number C of locking portions 2112 among the multiple locking portions 2112 are uniformly arranged around the drive shaft 111. The total number of the locking portions 2112 is greater than or equal to C. In this example, the electric motor 12 is a four-pole six-slot brushless inrunner, that is to say, N is 6 and M is 4. Therefore, twelve locking portions 2112 are uniformly disposed around an outer surface of the drive shaft 111. If the total number of the locking portions 2112 is greater than 12, the remaining locking portions 2112 are disposed among the twelve locking portions 2112 separately. That is to say, it is ensured that the twelve locking portions 2112 are spaced apart from each other by 30 degrees and the remaining locking portions 2112 are placed among the twelve locking portions 2112 according to a situation.

In this example, the multiple locking portions 2112 are multiple slots which face the first axis 101 and extend in a radial direction. The stop position is in a slot. That is to say, the first position of the execution portion 2114 is in the slot. The stop position coincides with the midpoint of the slot.

In order that the execution portion 2114 is engaged with the locking portion 2112 more smoothly, at least one of the second shaft locking member 211*b* or the first shaft locking member 211*a* is provided with a guide portion 2141 which guides the execution portion 2114 into engagement with the locking portion 2112. In this example, the slot is provided with a guide surface at an end of the slot from which the shaft locking rod 2113 is inserted into the slot, and the guide surface is used for guiding the shaft locking rod 2113 to be inserted into the slot.

Figure 15:
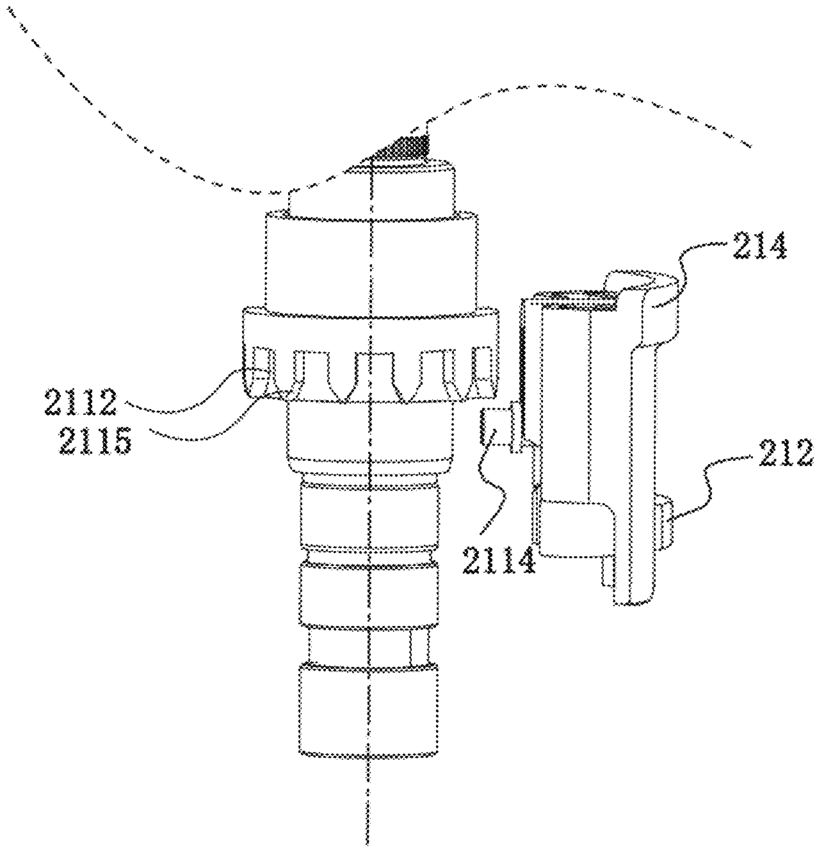
FIG. 15 is a structure view of the components in FIG. 11 from another angle of view, where a shaft locking assembly is in a second state.
Figure 16:
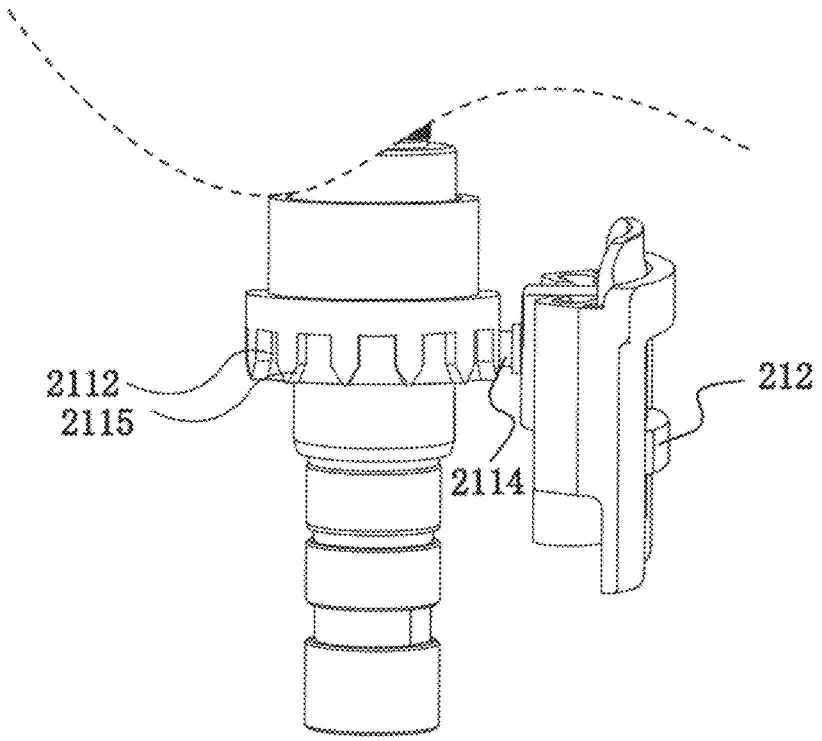
FIG. 16 is a structure view of the components in FIG. 11 from another angle of view, where a shaft locking assembly is in a first state.
Figure 17:
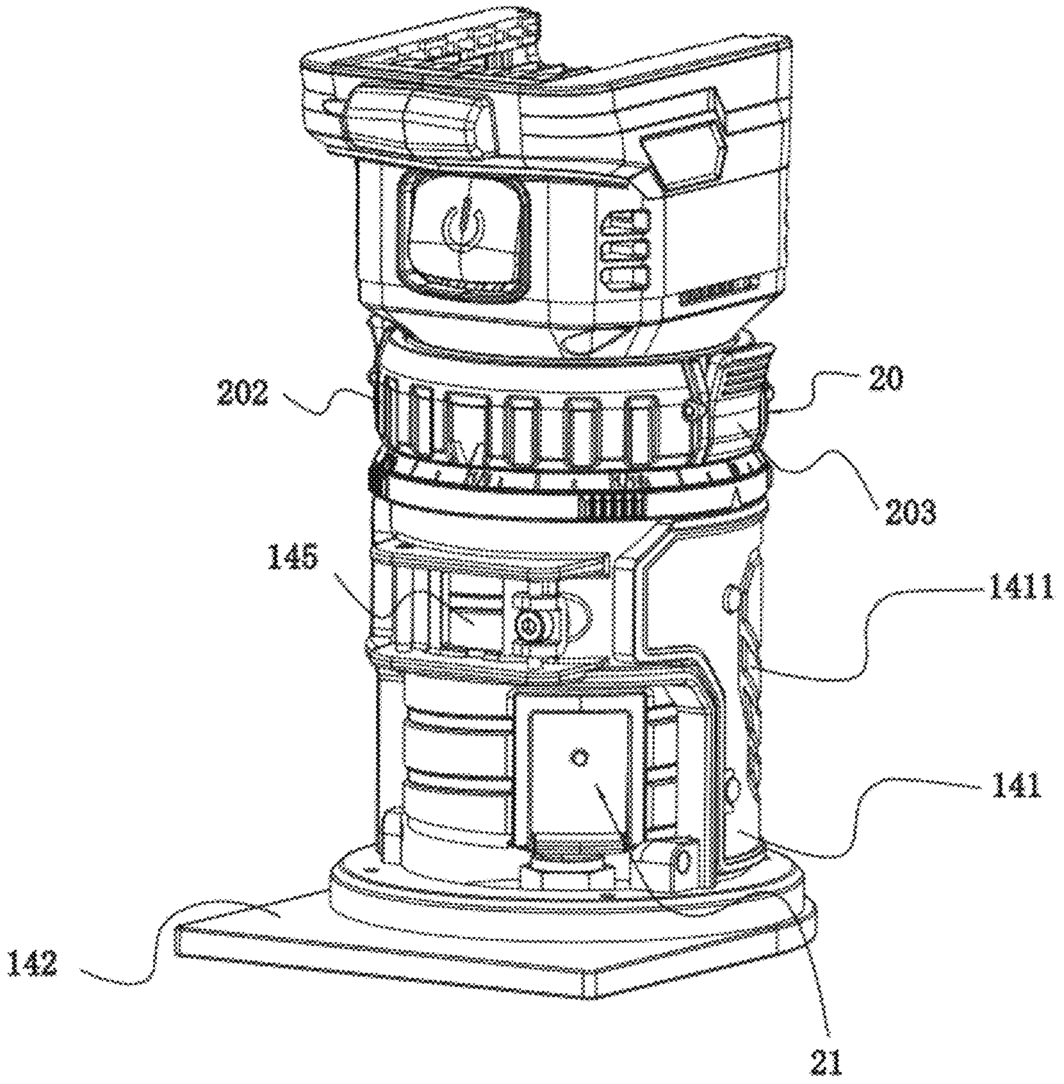
FIG. 17 is a structure view of the main body of the first example in FIG. 3 from another angle of view, where a locking mechanism is removed.

When the tool bit needs to be replaced, the user operates the first push portion to slide on the housing 12, and the shaft locking rod 2113 is engaged with the slot along the direction parallel to the first axis 101 of the shaft of the electric motor. Further, as shown in FIG. 16, the rotation of the shaft locking disc 2111 about the first axis 101 is restrained, the rotation of the drive shaft 111 about the first axis 101 is locked, and the shaft locking assembly 211 is in the first state. As shown in FIG. 15, when the user pulls back the first push portion 2121, the shaft locking rod 2113 is disengaged from the slot, the rotation of the shaft locking disc 2111 about the first axis 101 and the rotation of the drive shaft 111 about the first axis 101 are released, and the shaft locking assembly 211 is in the second state.

As shown in FIGS. 3 to 6 and FIGS. 17 to 24, the baseplate 142 of the base 14 is in the shape of a flat plate. In this example, the baseplate 142 is made of a transparent material. By means of the baseplate 142, the router 100 can be supported on the workpiece (not shown in the figures) to be machined. The baseplate 142 includes a central hole 1421, and the drive shaft 111 and/or the power output assembly 13 extend through the central hole 1421 to the outside.

The router 100 further includes a height adjustment mechanism 20 for adjusting a sliding distance of the base 14 relative to the housing 12 along the first axis 101. The adjustment of the sliding distance of the base 14 relative to the housing 12 is equivalent to the adjustment of a height of the tool bit (for example, a milling cutter) relative to the machined workpiece.

The router 100 further includes a second locking mechanism 19 for selectively locking and unlocking a relative slide between the base 14 and the housing 12 along the first axis 101. The second locking mechanism 19 may selectively provide the base 14 and/or the housing 12 with a locking force F for keeping the relative position between the base 14 and the housing 12. When the second locking mechanism 19 locks the relative slide between the base 14 and the housing 12, the second locking mechanism 19 provides the base 14 and/or the housing 12 with the locking force F for keeping the relative position between the base 14 and the housing 12. When the second locking mechanism 19 unlocks the relative slide between the base 14 and the housing 12, the second locking mechanism 19 reduces or does not apply the locking force F for keeping the relative position between the base 14 and the housing 12 to the base 14 and/or the housing 12 so that the relative position between the base 14 and the housing 12 is allowed to be adjusted by the height adjustment mechanism 20. In this example, the second locking mechanism 19 is disposed above the sleeve 141, and the locking force F is applied to the main body portion 123 of the housing 12.

In this example, the second locking mechanism 19 includes a handle 191, a push rod element 192, and a locking element 193. The handle 191 includes an operation end 191*b* to be operated by the user and a connection end 191*a*. The connection end 191*a* of the handle 191 is connected to the sleeve 141 through a second shaft 195, and the sleeve 141 is provided with a slit or a hole extending along the first axis 101. In this example, the sleeve 141 is provided with a hole 145 extending along the first axis 101. The handle 191 stretches across the hole 145 and is provided with the operation end 191*b* and the connection end 191*a* on two sides of the hole 145. The connection end 191*a* is engaged with the push rod element 192. The locking element 193 is connected to the push rod element 192. In other examples, the locking element 193 and the push rod element 192 may be integrally formed. The push rod element 192 includes a first end 192*a* on one side of the locking element 193 and a second end 192*b* on the other side of the locking element 193. The push rod element 192 is configured to stretch across the hole 145 and disposed on the two sides of the hole 145. The locking element 193 is disposed at least partially opposite to the hole 145. The connection end 191*a* is selectively engaged with the first end 192*a* of the push rod element 192. The second end 192*b* of the push rod element 192 is disposed on the sleeve 141 through a first shaft 194. In other alternative examples, the second end 192*b* of the push rod element 192 may be disposed on the housing 12. The push rod element 192 rotates about an axis 1941 of the first shaft.

Figure 18:
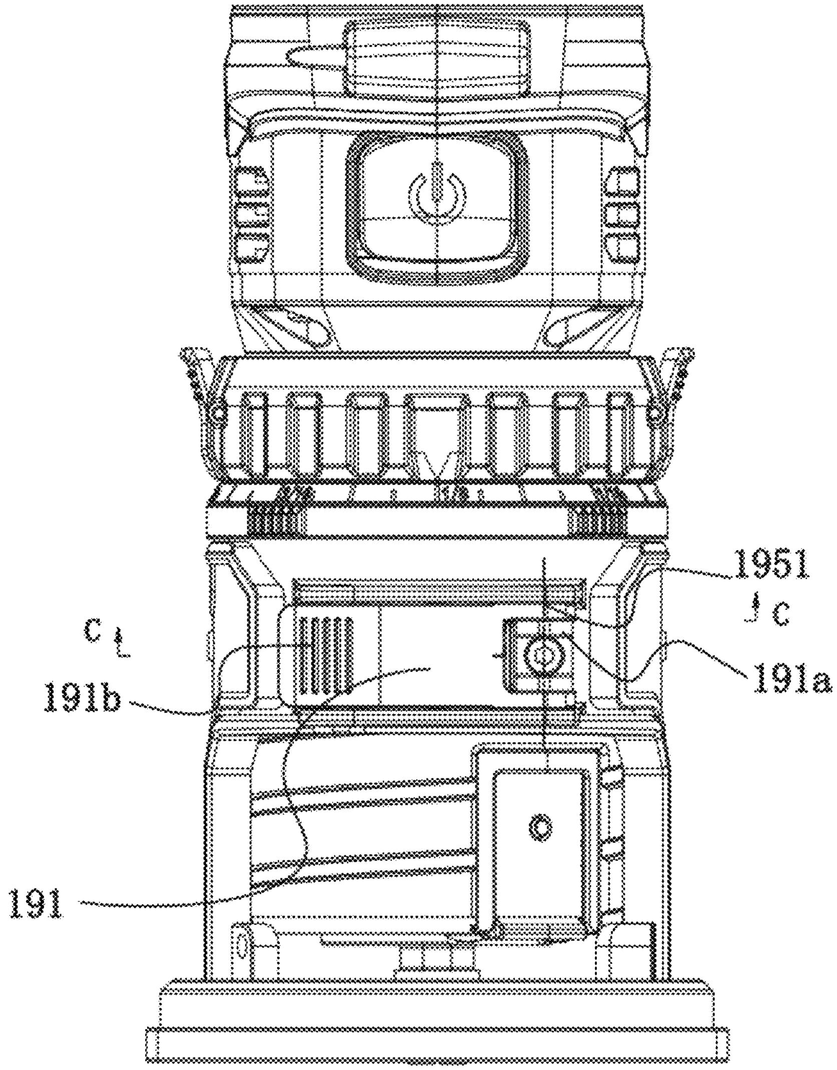
FIG. 18 is a plan view of the main body of the first example in FIG. 3 from another angle of view, where a handle of a locking mechanism is in a first position.
Figure 19:
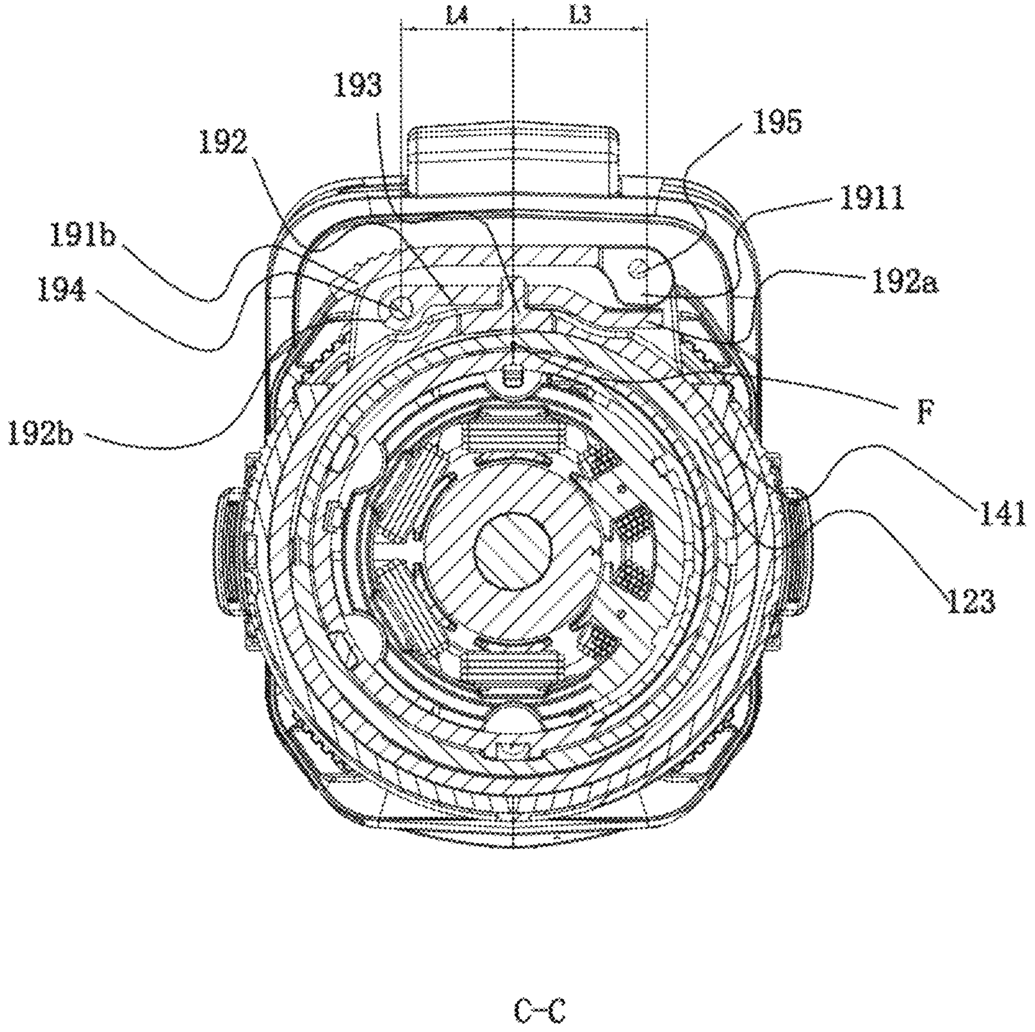
FIG. 19 is a cross-sectional view taken along C-C in FIG. 18.
Figure 20:
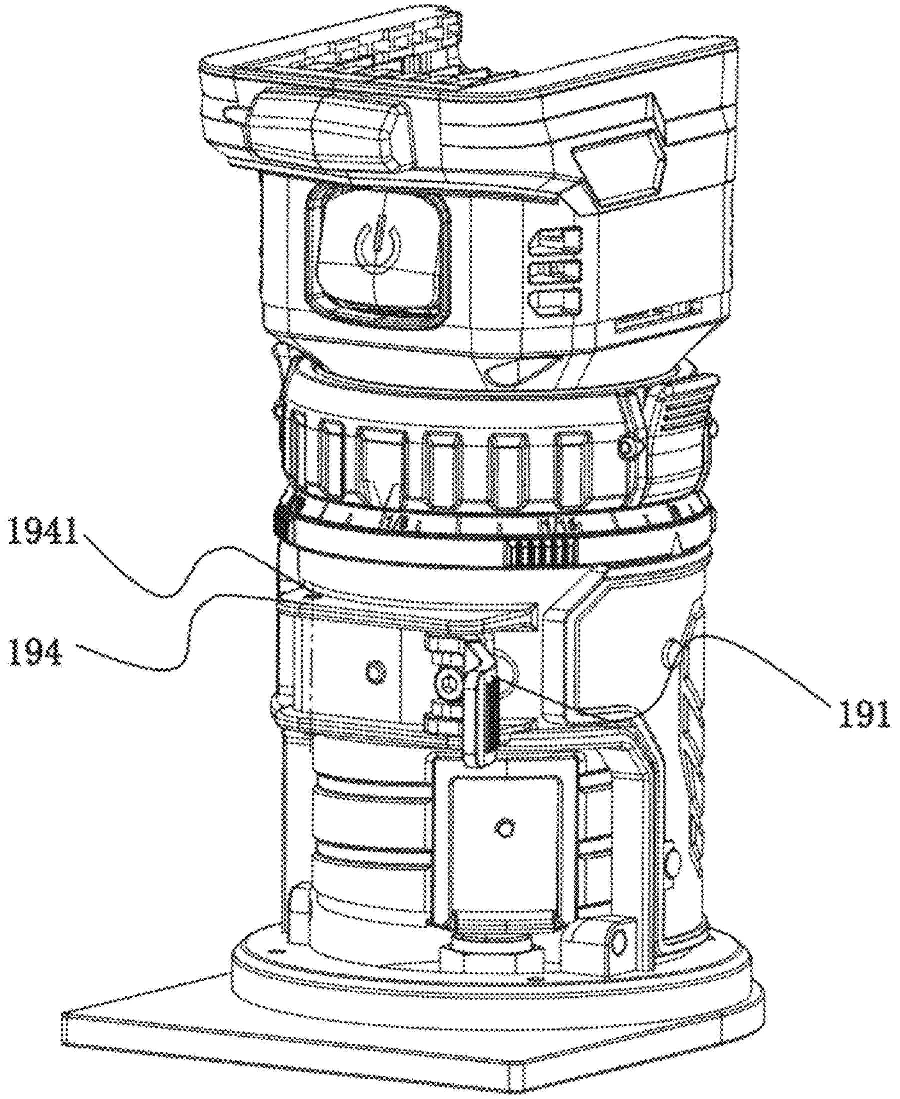
FIG. 20 is a structure view of the main body of the first example in FIG. 3 from another angle of view, where a handle of a locking mechanism is in a second position.
Figure 21:
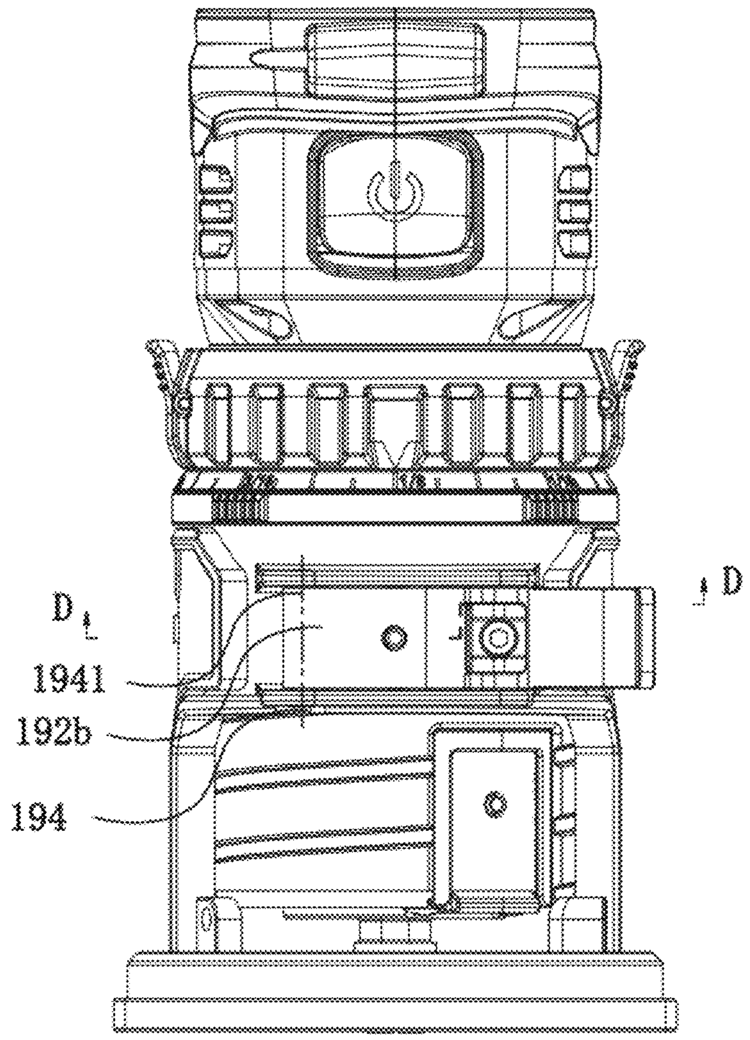
FIG. 21 is a plan view of FIG. 20 from another angle of view.
Figure 22:
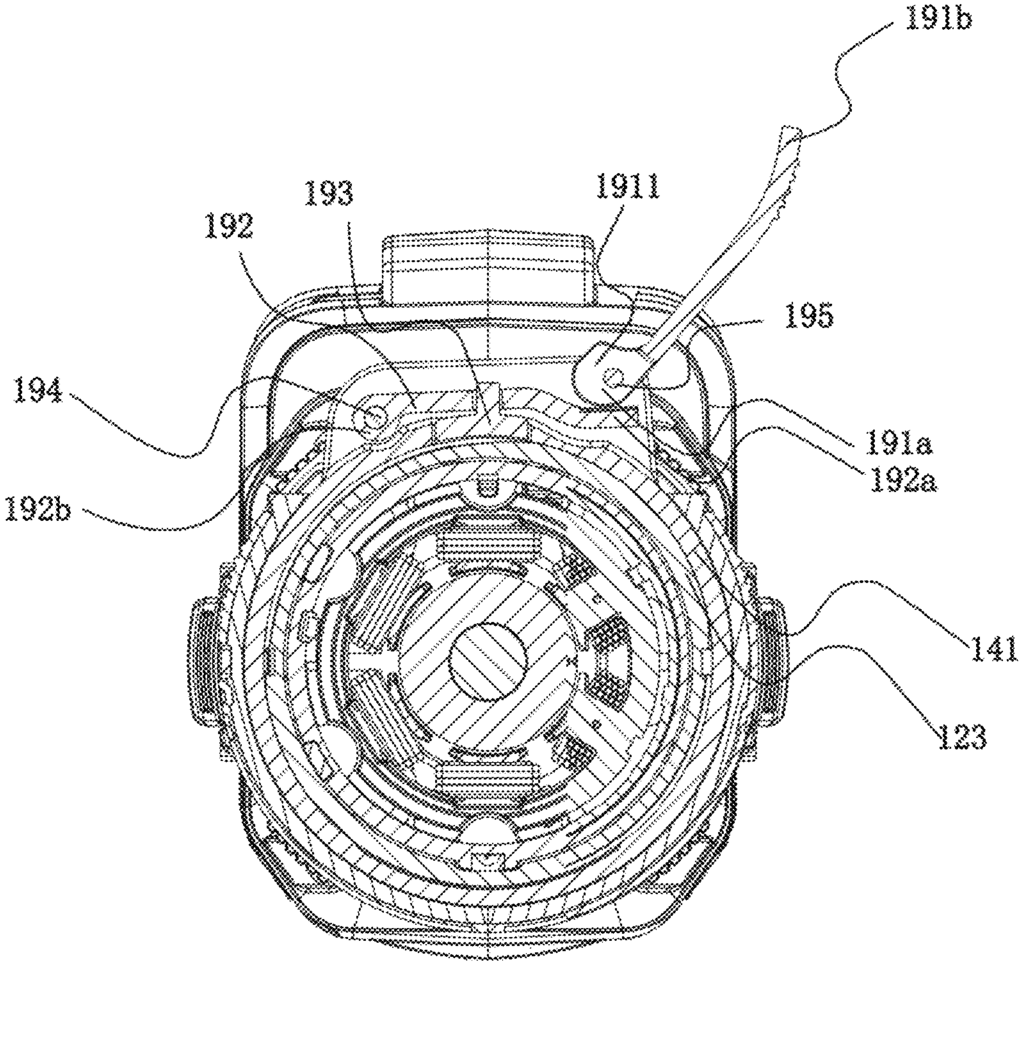
FIG. 22 is a cross-sectional view taken along D-D in FIG. 21.
Figure 23:
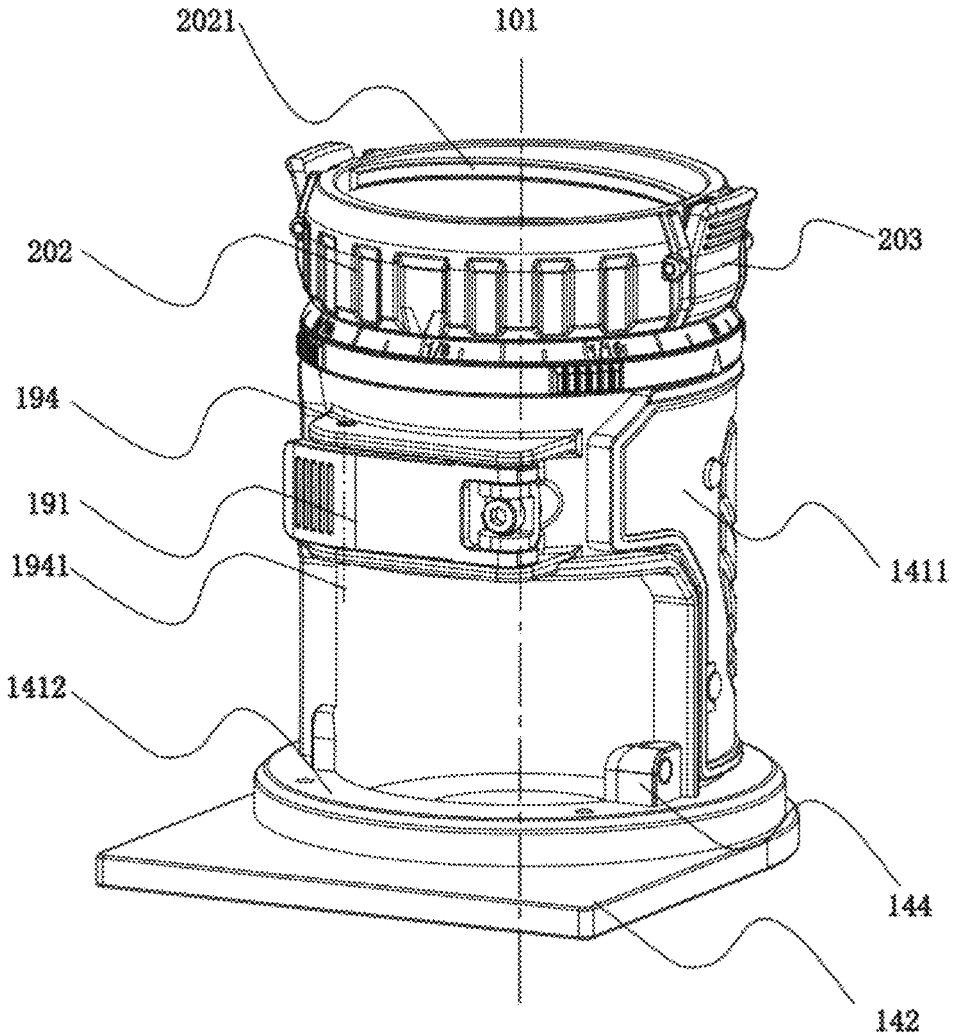
FIG. 23 is a structure view of a base in FIG. 4.
Figure 24:
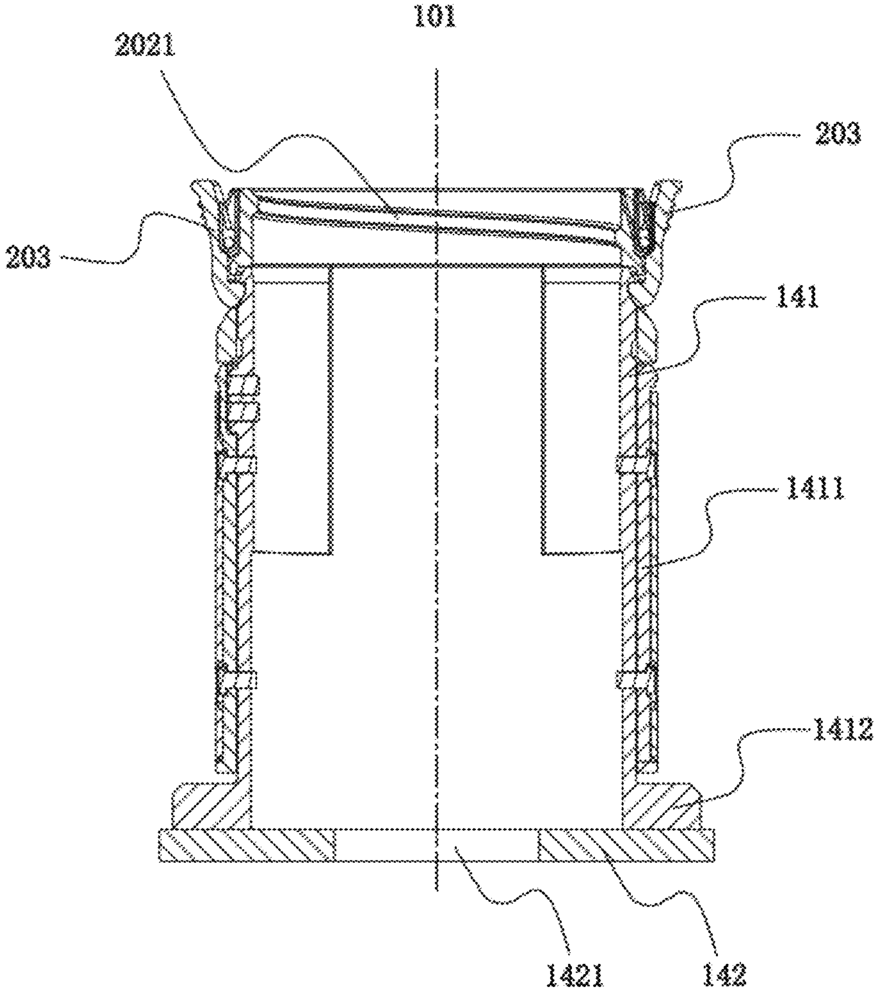
FIG. 24 is a sectional view of FIG. 23.
Figure 25:
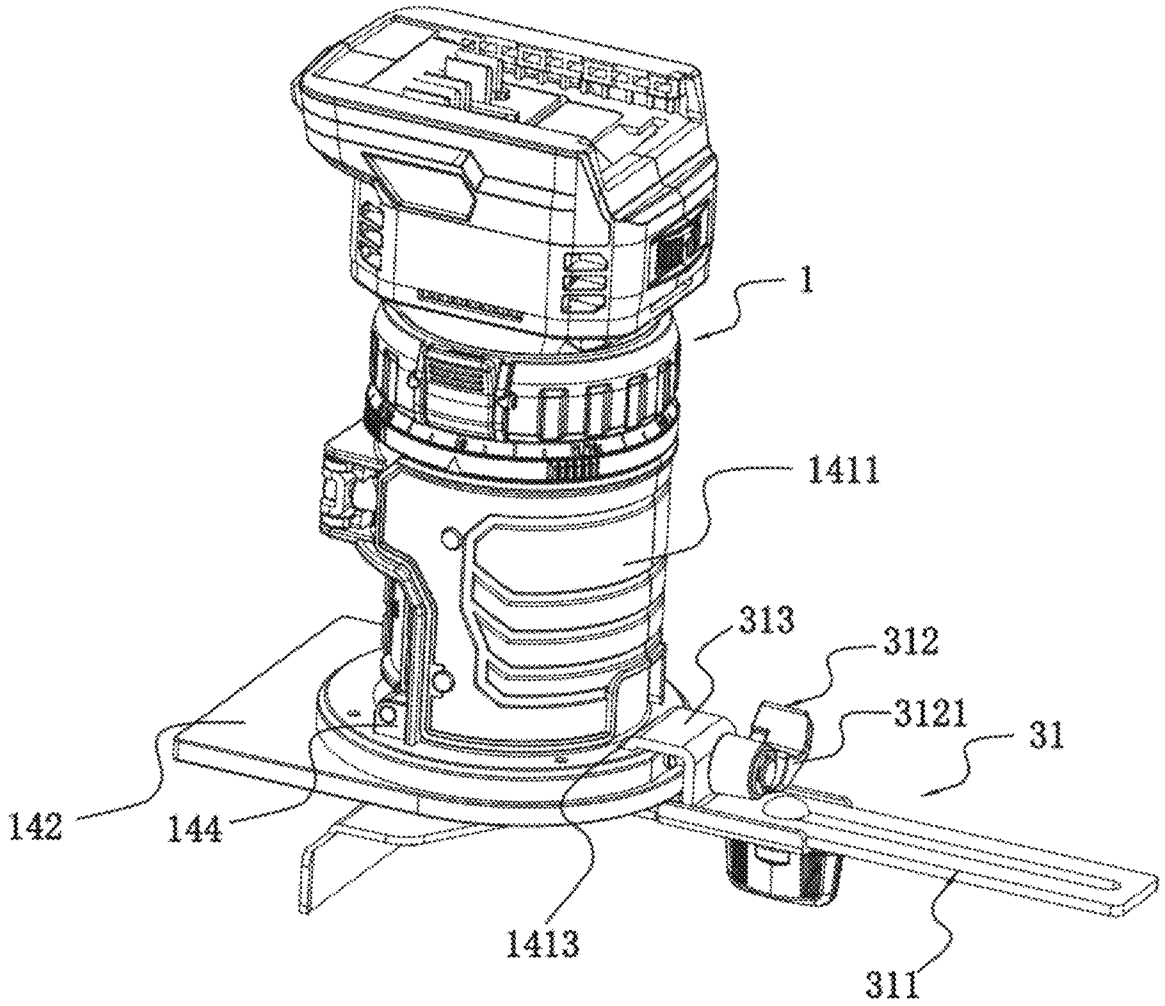
FIG. 25 is a structure view of the main body and a guide mechanism of the first example in FIG. 2 from another angle of view.
Figure 26:
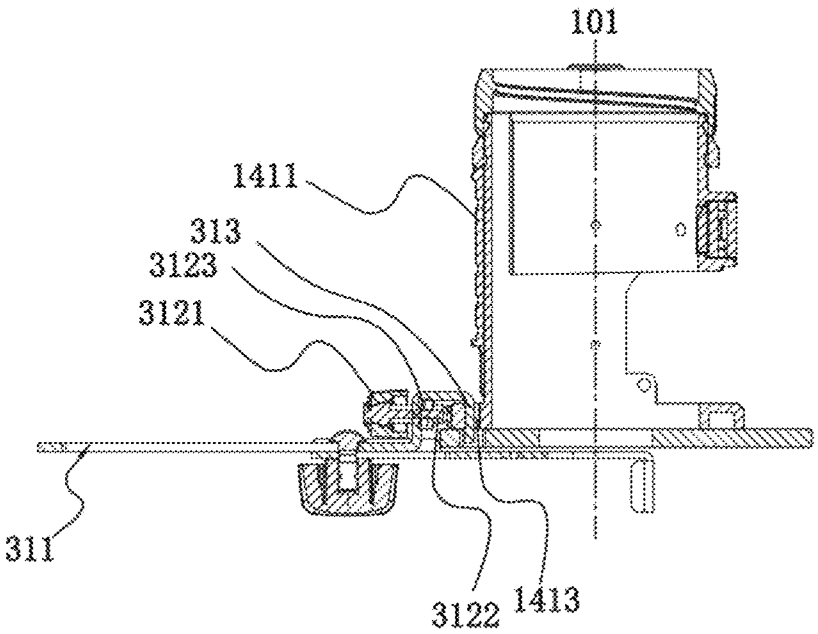
FIG. 26 is a sectional view of a base and a guide mechanism in FIG. 15.

The handle 191 includes a first position where the relative slide between the base 14 and the housing 12 is locked and a second position where the relative slide between the base 14 and the housing 12 is unlocked. As shown in FIGS. 18 and 19, the handle 191 is in the first position. As shown in FIGS. 20 to 22, the handle 191 is in the second position. The handle 191 switches between the first position and the second position by rotating about an axis 1951 of the second shaft.

When the handle 191 is in the first position, the handle 191 is connected to the first end 192*a* of the push rod element 192 through the connection end 191*a* and drives the locking element 193 to apply the locking force F for locking the relative slide between the base 14 and the housing 12 to the housing 12 through the hole 145. When the handle 191 is in the second position, the locking force F is reduced or not applied, and the relative slide between the base 14 and the housing 12 is allowed. Specifically, when the handle 191 is in the first position, the locking element 193 passes through the hole 145 and abuts against the main body portion 123 to provide the locking force F, so as to keep the relative position between the base 14 and the housing 12. When the handle 191 is in the second position, the locking element 193 is disengaged from or only in contact with the main body portion 123, and the locking force F is reduced or not applied. The direction of the locking force F points to the drive shaft 111, that is to say, the direction of the locking force F is perpendicular to the first axis 101.

The locking element 193 in the second locking mechanism 19 is inside the push rod element 192, the first end 192*a* of the push rod element 192 is engaged with the handle 191 and serves as an end for applying the force, and the second end 192*b* of the push rod element 192 is a rotation shaft of the push rod element 192 and serves as a fulcrum so that when the locking element 193 is compressed to generate the locking force, the force applied to the locking element 193 is more uniform, the structure of the locking element 193 is reliable, and locking by the second locking mechanism 19 is reliable. In addition, the locking element 193 is disposed inside the push rod element 192, which can reduce the volume of the second locking mechanism 19, thereby facilitating product miniaturization.

In order that the second locking mechanism 19 has better operability, when the handle 191 is in the first position, a linear distance L3 from the locking element 193 to a point where the connection end 191*a* of the handle 191 applies the force to the first end 192*a* of the push rod element 192 is greater than or equal to a linear distance L4 from the locking element 193 to the axis 1941 of the first shaft.

In this example, the connection end 191*a* of the handle 191 is provided with a cam 1911 which rotates about the axis 1951 of the second shaft. When the handle 191 is in the first position, the cam 1911 pushes the first end 192*a* of the push rod element 192 toward the drive shaft 111, that is to say, a long-diameter outer peripheral surface of the cam 1911 abuts against the push rod element 192, the locking element 193 is pushed by the push rod element 192 toward the main body portion 123, and the locking element 193 abuts against the main body portion 123 of the housing 12.

In this example, the locking element 193 includes or is formed with a resilient element. Specifically, the locking element 193 includes a portion made of a material which can be compressed and resiliently reset, such as nylon or rubber. When the handle 191 is in the first position, the locking element 193 is compressed by the push rod element 192 to store energy.

When the handle 191 is in the second position, the cam 1911 rotates around the second shaft 195 until the cam 1911 is disengaged from the first end 192*a* of the push rod element 192, that is, the long-diameter outer peripheral surface of the cam 1911 leaves the first end 192*a* of the push rod element 192, and a short-diameter outer peripheral surface of the cam 1911 is only in contact with or is not in contact with the first end 192*a* of the push rod element 192. Since the locking element 193 is not compressed or is subjected to a reduced compressive force, the locking element 193 is resiliently reset and drives the push rod element 192 to rotate about the axis 1941 of the first shaft and away from the drive shaft 111.

In other alternative examples, the push rod element 192 may be formed with or include a resilient element. Specifically, the push rod element 192 includes or is made of a material which can be compressed and resiliently reset. When the handle 191 is in the first position, the push rod element 192 is compressed by the handle 191 to store energy.

In other alternative examples, the second locking mechanism 19 may include a resilient element for providing a resilient reset force for the push rod element 192.

When the handle 191 is in the second position, the cam 1911 rotates around the second shaft 195 until the cam 1911 is disengaged from the first end 192*a* of the push rod element 192, that is, the long-diameter outer peripheral surface of the cam 1911 leaves the first end 192*a* of the push rod element 192, and the short-diameter outer peripheral surface of the cam 1911 is only in contact with or is not in contact with the first end 192*a* of the push rod element 192. Since the push rod element 192 is not compressed or is subjected to a reduced compressive force, the push rod element 192 is resiliently reset and rotates about the axis 1941 of the first shaft and away from the drive shaft 111.

In this example, in the direction of the locking force F, the axis 1951 of the second shaft is above the axis 1941 of the first shaft, or the axis 1951 of the second shaft is flush with the axis 1941 of the first shaft.

In this example, the height adjustment mechanism 20 includes a first thread 201 and a height adjustment ring 202. The first thread 201 is disposed on an outer surface of the main body portion 123 of the housing 12, and the first thread 201 extends along the first axis 101 on the cylindrical outer surface of the main body portion 123. The height adjustment ring 202 is disposed at an upper end of the sleeve 141 of the base 14, the height adjusting ring 202 is sleeved on an outer side of the first thread 201, and a second thread 2021 which can be in a threaded connection with the first thread 201 is disposed on an inner side of the height adjustment ring 202. A connection fastener 203 is disposed on the height adjustment ring 202, where the connection fastener 203 optionally connects the height adjustment ring 202 to the upper end of the sleeve 141 or disconnects the height adjustment ring 202 from the upper end of the sleeve 141. When the second locking mechanism 19 unlocks the relative slide between the base 14 and the housing 12, the connection fastener 203 is closed to connect the height adjustment ring 202 to the sleeve 141, and the height adjustment ring 202 is rotated relative to the housing 12 such that the upward or downward relative movement between the housing 12 and the base 14 along the first axis 101 occurs. When the second locking mechanism 19 unlocks the relative slide between the base 14 and the housing 12, the connection fastener 203 is opened to disconnect the height adjustment ring 202 from the sleeve 141 such that the base 14 can be detached from the housing 12.

As shown in FIGS. 1 and 2, the accessory 3 of the router 100 includes a guide mechanism 31 and a dust collection shield mechanism 32. The accessory 3 is selectively mounted to the main body 1 according to the user's needs. Therefore, relatively high requirements are placed on the mounting simplicity and storage integrity and convenience of the accessory 3. A structure of the guide mechanism 31 and a mounting manner of the guide mechanism 31 are described in detail below.

As shown in FIGS. 1 and 2 and FIGS. 23 to 27, the guide mechanism 31 includes a guide assembly 311 and a mounting assembly 312, where the guide assembly 311 is used for guiding the tool bit to move along a preset track. The mounting assembly 312 is used for detachably mounting the guide assembly 311 to the base 14. The mounting assembly 312 includes an operation portion 3121 and a latch portion 3122, where the latch portion 3122 is connected to the guide assembly 311 and the operation portion 3121 controls the latch portion 3122 to be locked to or unlocked from the baseplate 142. The operation portion 3121 includes a first position and a second position, where when the operation portion 3121 is in the first position, the latch portion 3122 locks the guide assembly 311 to the base 14, and the tool bit may be guided by the guide assembly 311 to move. When the operation portion 3121 is in the second position, the latch portion 3122 unlocks the connection between the guide assembly 311 and the base 14, and the guide assembly 311 and the latch portion 3122 are detached from the main body 1. It is to be understood that the operation portion 3121 may include only two position states, that is, the first position and the second position, or multiple position states may be provided in addition to the first position and the second position. When the operation portion 3121 is in the second position, the latch portion 3122 is still connected to the guide assembly 311, and the operation portion 3121 is connected to the latch portion 3122 or the guide assembly 311. Therefore, after the guide mechanism 31 is detached from the main body 1, the guide assembly 311 and the mounting assembly 312 are still connected together, and the mounting assembly 312 is not easily lost when stored.

In order to ensure the stability of the connection between the guide assembly 311 and the mounting assembly 312, specifically, the latch portion 3122 is provided with a limiting structure 3123. The limiting structure 2123 causes the latch portion 3122 and the guide assembly 311 to be configured in such manner that when the operation portion 3121 is in the second position, the limiting structure 2123 keeps the latch portion 3122 on the guide assembly 311, or the limiting structure 2123 causes the latch portion 3122 and the guide assembly 311 to be detachably connected by use of an auxiliary tool or a special tool or to be non-detachably connected.

The user switches the operation portion 3121 between the first position and the second position only with hands, that is to say, the user can switch the operation portion 3121 between the first position and the second position without the assistance of a tool (such as a screwdriver or a wrench).

When the guide mechanism 31 is mounted on the base 14, the guide mechanism 31 is disposed below the grip 1411 of the base 14 so that the guide mechanism 31 does not affect the grip of the user.

Specifically, the latch portion 3122 is a screw with an external thread, where one end of the screw is connected to the operation portion 3121, and the other end of the screw is optionally connected to the base 14. The latch portion 3122 moves back and forth along the direction perpendicular to the first axis 101, and the screw is connected to the base 14 after passing through the guide assembly 311. In this example, the end of the sleeve 141 is provided with an annular protrusion 1412, and the baseplate 142 is mounted on a lower bottom surface of the annular protrusion 1412. A location hole 1413 is disposed on the annular protrusion 1412, and the mounting assembly 312 further includes a location and connection portion 313 connected to the location hole 1413. Thus, when the operation portion 3121 is switched between the first position and the second position, the guide mechanism 31 is kept on the base 14 by the location and connection portion 313 and is not disengaged from the main body 1. Therefore, when the user switches the operation portion 3121 between the first position and the second position, the user does not need to grip the guide assembly 311 to keep its position.

When the operation portion 3121 is in the first position, the screw abuts against or is inserted into a sidewall of the annular protrusion 1412. When the operation portion 3121 is in the second position, the screw is disengaged from the annular protrusion 1412, and the guide mechanism 31 can be detached from the main body 1.

Specifically, the limiting structure 2123 is a limiting nut connected to the guide assembly 311, and the screw passes through the limiting nut and moves back and forth in the limiting nut along the direction perpendicular to the first axis 101. When the operation portion 3121 is in the second position, an end portion of the screw is still beyond the limiting nut by a distance so that the screw will not easily fall from the guide assembly 311.

Figure 27:
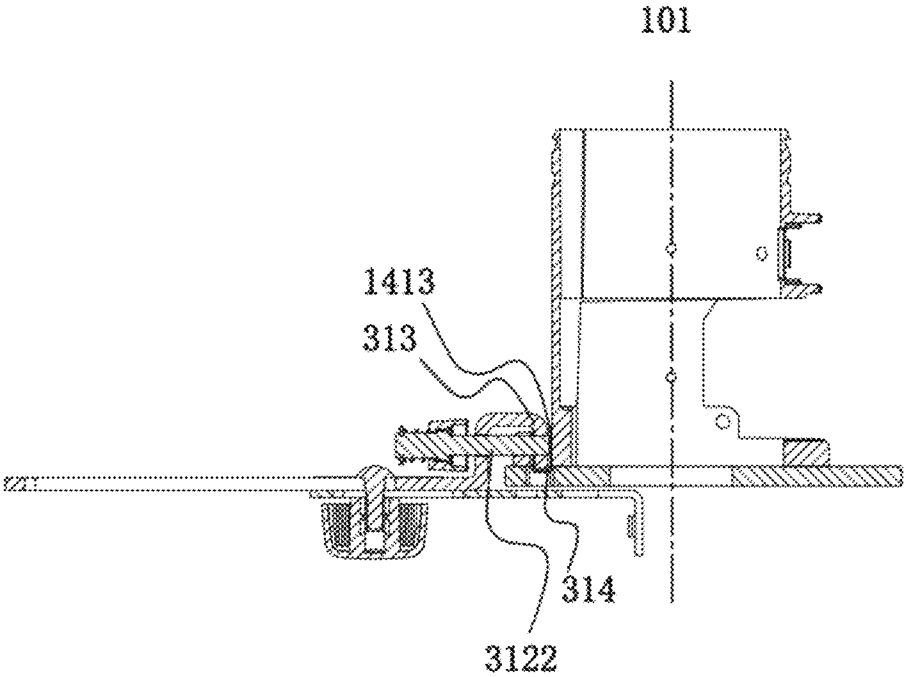
FIG. 27 shows a mounting manner of another example of FIG. 26.
Figure 28:
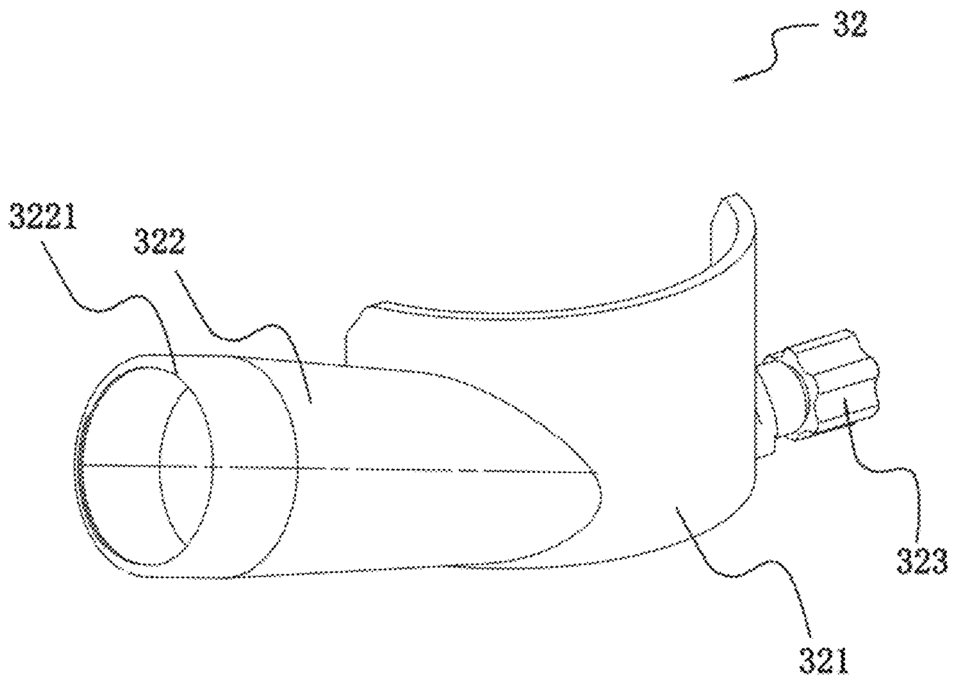
FIG. 28 is a structure view of a dust collection shield mechanism of the first example in FIG. 2.
Figure 29:
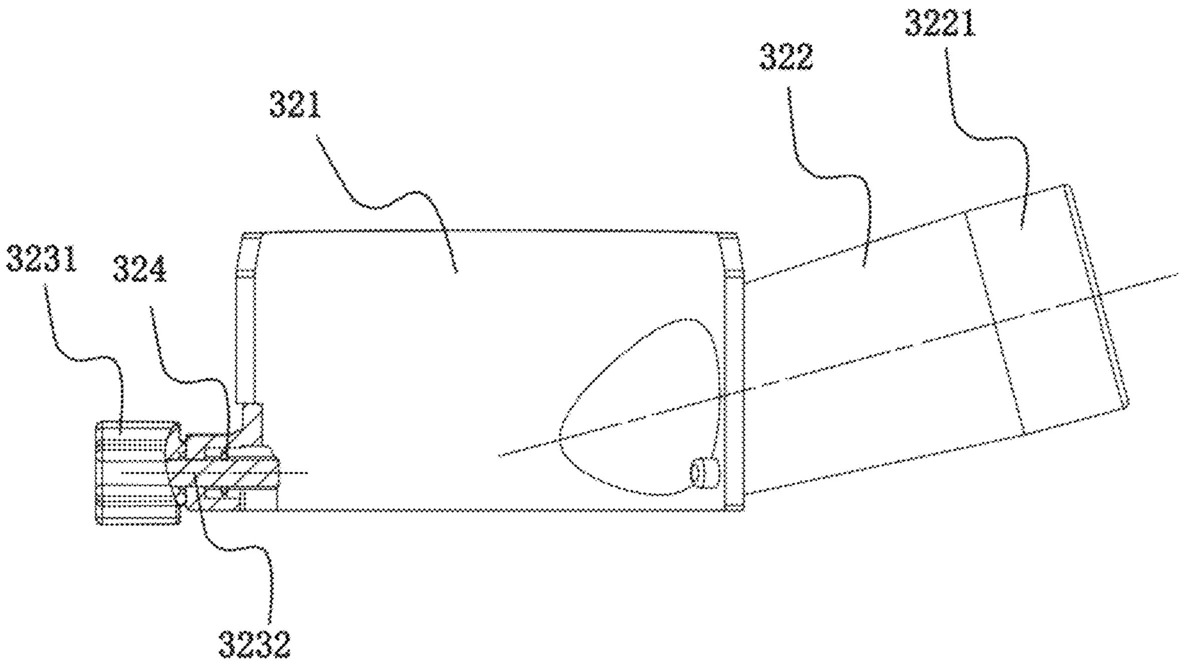
FIG. 29 is a partial sectional view of FIG. 28 from another angle of view.

As shown in FIG. 27, as an alternative example, in order to ensure that the guide assembly 311 does not deform, for example, warp, when the operation portion is in the first position, that is, a locking position, the latch portion 3122 passes through the location and connection portion 313 and abuts against an inner sidewall of the location hole 1413. In this case, force directions on two sides of the location and connection portion 313 are balanced with each other so that the guide assembly 311 does not deform when the operation portion is switched between the first position and the second position. A gasket 314 is disposed on each of the front and rear sidewalls of the location and connection portion 313.

As shown in FIGS. 1, 2, 23, 24, 28, and 29, a structure of the dust collection shield mechanism 32 and a mounting manner of the dust collection shield mechanism 32 are described in detail below. The dust collection shield mechanism 32 is detachably mounted on the main body 1. Specifically, the dust collection shield mechanism 32 is mounted on the base 14. When the workpiece is machined by the tool bit, a large amount of chips, dust, and the like are generated, which has a relatively great influence on both a working environment and user experience. In the related art, an external dust collector is a main method for solving this problem. The dust collection shield mechanism 32 mainly provides an interface connected to the external dust collector and forms a discharge channel for the chips to enter the dust collector.

In this example, the dust collection shield mechanism 32 includes a shield body 321 and a dust collection channel 322, where the shield body 321 has an arc shape mating with an outer sidewall of the sleeve 141, and when the shield body 321 is mounted on the sleeve 141, a complete cylindrical outer wall of the sleeve 141 is formed. Thus, when the router 100 works, the discharge channel is formed which flows from the surface of the workpiece, flows through the central hole 1421 of the baseplate 142, enters the dust collection channel 322, and enters the dust collector. One end of the dust collection channel 322 communicates with the central hole 1421 of the baseplate 142, and the other end of the dust collection channel 322 is provided with a joint 3221 connected to the dust collector. The shield body 321 and the dust collection channel 322 are integrally formed, or the shield body 321 and the dust collection channel 322 may be two separate components which are assembled into a whole.

The dust collection shield mechanism 32 further includes a shield mounting assembly 323 for mounting the dust collection shield mechanism 32 to the base 14. The shield mounting assembly 323 includes a shield operation portion 3231 and a shield locking portion 3232, where the shield locking portion 3232 is connected to the shield body 321, and the shield operation portion 3231 controls the shield locking portion 3232 to be locked to or unlocked from the base 14. The shield operation portion 3231 includes a first position and a second position, where when the shield operation portion 3231 is in the first position, the shield locking portion 3232 locks the shield body 321 to the base 14. When the shield operation portion 3231 is in the second position, the shield locking portion 3232 unlocks the connection between the shield body 321 and the base 14, and the dust collection shield mechanism 32 can be detached from the main body 1. It is to be understood that the shield operation portion 3231 may include only two position states, that is, the first position and the second position, or multiple position states may be provided in addition to the first position and the second position. When the shield operation portion 3231 is in the second position, the shield locking portion 3232 is still connected to the shield body 321, and the shield operation portion 3231 is connected to the shield locking portion 3232 or the shield body 321. Therefore, after the dust collection shield mechanism 32 is detached from the main body 1, the shield body 321 and the shield mounting assembly 323 are still connected together, and the shield mounting assembly 323 is not easily lost when stored.

In order to ensure the stability of the connection between the shield body 321 and the shield mounting assembly 323, in this example, the shield locking portion 3232 is provided with a limiting structure 324. The limiting structure 324 causes the shield locking portion 3232 and the shield body 321 to be configured in such manner that when the shield operation portion 3231 is in the second position, the limiting structure 324 keeps the shield locking portion 3232 on the shield body 321, or the limiting structure 324 causes the shield locking portion 3232 and the shield body 321 to be detachably connected by use of an auxiliary tool or a special tool or to be non-detachably connected.

The user switches the shield operation portion 3231 between the first position and the second position only with hands, that is to say, the user can switch the shield operation portion 3231 between the first position and the second position without the assistance of the tool.

A reception portion 144 which mates with the shield locking portion 3232 is disposed on the base 14. In this example, the shield locking portion 3232 includes a screw with an external thread, and the reception portion 144 includes a threaded hole mating with the screw. When the shield operation portion 3231 is in the first position, the screw and the threaded hole are in a threaded connection to each other. When the shield operation portion 3231 is in the second position, the screw is disengaged from the threaded hole, and the dust collection shield mechanism 32 can be detached from the main body 1.

As shown in FIG. 5, FIG. 6, FIG. 30 and FIG. 31, the power output assembly 13 is formed or connected to a lower end of the drive shaft 111. The power output assembly 13 is used to connect with the tool bit (not shown in the figure) that performs an operation on the workpiece, such as a milling head, a saw blade, and so on. The power output assembly 13 includes a chuck 131 for connecting the tool bit. The chuck 131 is formed on or connected to the drive shaft 111. The lower end of the drive shaft 111 forms a receiving opening 113 for inserting the tool bit. The chuck 131 is connected to the lower end of the drive shaft 111 through a fastener 132, so that the tool bit can be detachably fixed on the chuck 131.

Figure 31:
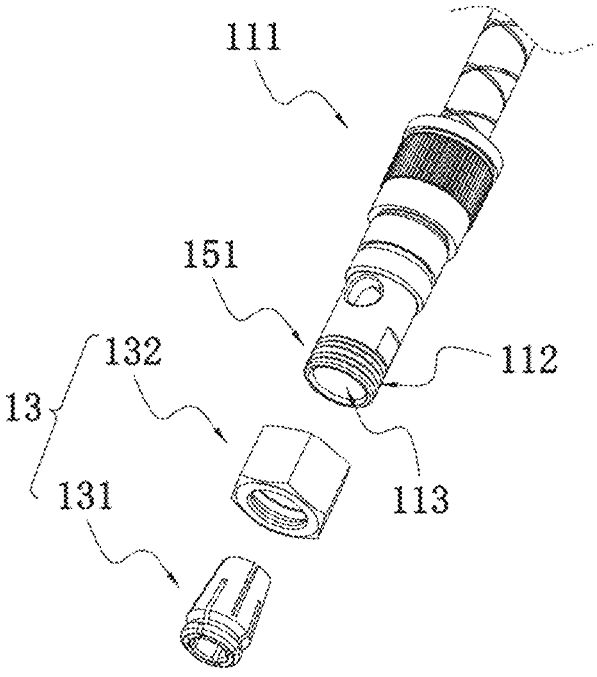

As shown in FIG. 31, an external thread 112 for engaging with the fastener 132 is located on an outer edge of the lower end of the drive shaft 111. In one example, the external thread 112 is an M14 thread with a thread pitch of 0.75 mm. Such setting is to make the power output assembly 13 adaptable to the tool bit with the specification of ER11, wherein the ER series chuck is a standard specification of the chuck. In other words, the drive shaft 111 comprises an adapting portion 151 to connect the chuck 131 conforming to the ER11 size standard, the chuck 131 being used to clamp a tool bit for cutting operations.

The fastener 132 is threaded with the external thread 112 of the drive shaft 111, and the tool bit is installed or released to the drive shaft 111 when tightening the fastener 132 to the drive shaft 111 or loosening the fastener 132 from the drive shaft 111. In one example, the chuck 131 could be an accessory belongs to the router 100. In another example, the chuck 131 could be an accessory that is not part of the router 100, and the user could acquire it from a third party.

The applicant found that the existing routers usually use special types of tool bit suitable for different routers, and cannot use the tool bit with standard specifications. When the router 100 is designed to be compatible with the ER11 standard tool bit, users can adapt the standard accessories by themselves, so that the router can be used more widely. In addition to this, the router 100 can not only be used for hand-held, but also be suited for CNC use. A regular hand-held router cannot be used to a CNC (Computer numerical control) machine to perform cutting operation, since the chuck and tool bit cannot satisfy the requirements of CNC machine. Our solutions make the router 100 to be used both by hand and by CNC machine, which widely increase the using situations for the router 100, and makes the updating of chucks and fasteners to be easier for users.

Figure 30:
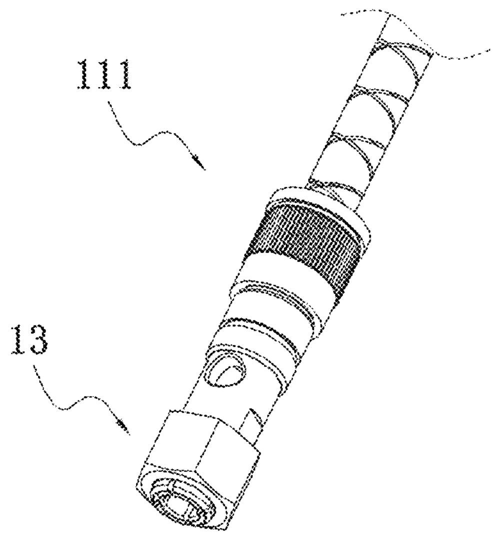
FIGS. 30-32 illustrates a power output assembly formed or connected to a lower end of a drive shaft.
Figure 32:
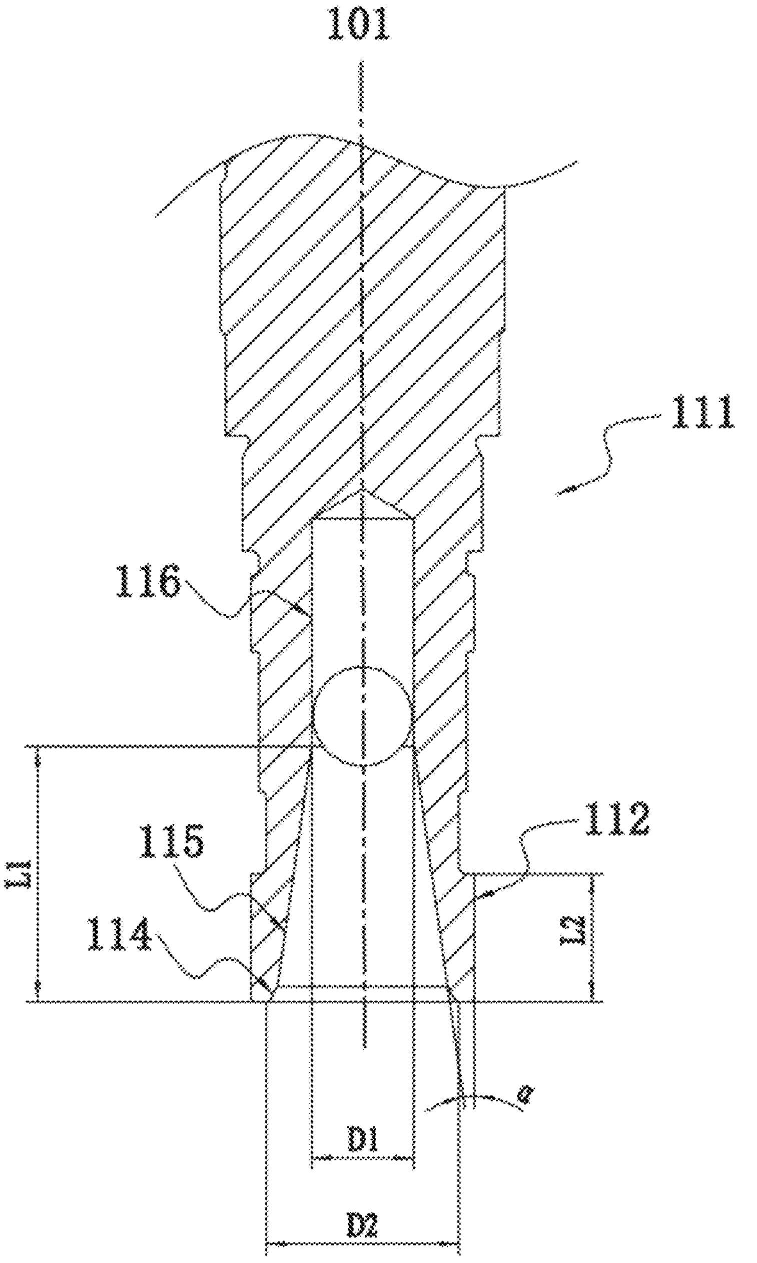
Figure 33:
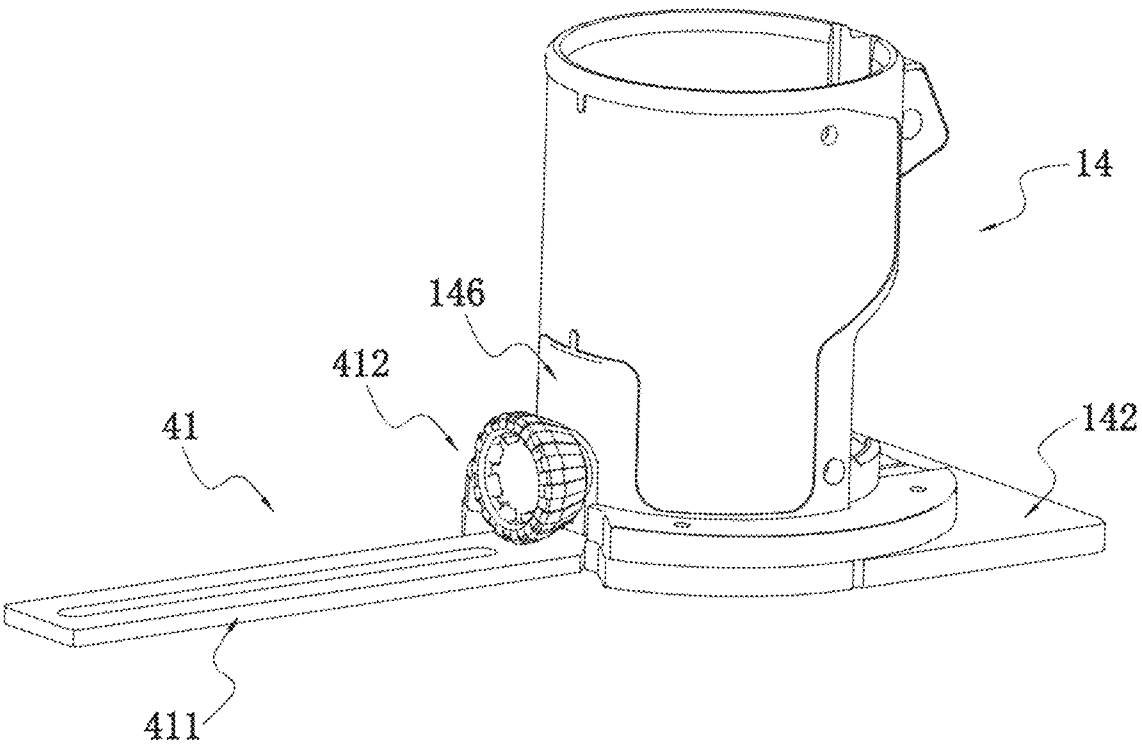
FIGS. 33-38 are examples of a guide mechanism of the router.

As shown in FIGS. 30 to 32, the tool bit passes through the chuck 131 and the fastener 132 in turn, and is inserted into the receiving opening 113, and then the fastener 132 and the external thread 112 are tightened to achieve locking. As shown in FIG. 32, the receiving port 113 is used to receive a part of the tool bit. The receiving opening 113 has a section of inclined side wall 115, and the angle between the inclined side wall 115 and the first axis 101 is a first angle $\alpha$. In this example, the first angle $\alpha$ is greater than or equal to 7.5 degrees and less than or equal to 8.5 degrees. In one example, the first angle $\alpha$ is 8 degrees. Errors caused by manufacturing are not considered here.

In one example, the lower end of the inclined side wall 115 has a chamfer 114 for making the tool bit inserted into the receiving opening 113 more easily. The upper end of the inclined side wall 115 has a vertical side wall 116. The setting of the first angle $\alpha$ enables the user to fit the tool bit tightly when using the ER11 series tool bit.

Further, the maximum distance from the bottom end of the receiving opening 113 to the inclined sidewall 115 is a first length L1, and the first length L1 is greater than or equal to 17 mm. The inclined sidewall 115 forms a smallest first diameter D1 in a direction perpendicular to the first axis 101, and the first diameter D1 is greater than or equal to 7.5 mm and less than or equal to 8 mm. The lower end of the inclined sidewall forms the chamfer 114, and the chamfer 114 forms a second largest diameter D2 in the direction perpendicular to the first axis 101, and the second diameter D2 is in the range of (11±0.05) mm. The maximum distance of the external thread 1120 along the direction of the first axis 101 is a second length L2, and the second length L2 is greater than or equal to 10 mm.

FIG. 33 to FIG. 36 are specific implementations of the guide mechanism 41 of the router 100. The guide mechanism 41 includes a guide assembly 411 and an adjusting component 412. The guide assembly 411 is used to guide the tool bit to move along a preset path, and the adjustment assembly 412 is used to install the guide assembly 411 on the base 14 detachably.

Figure 34:
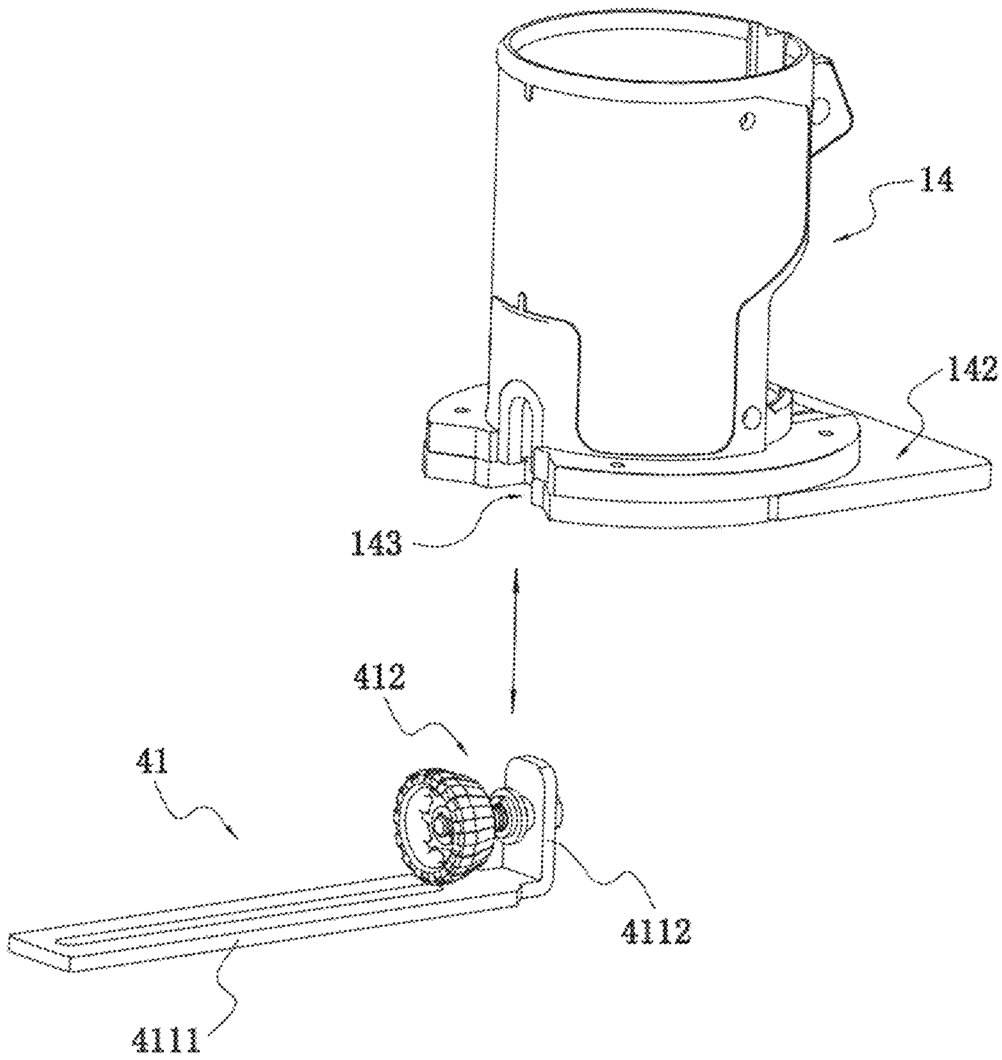

As shown in FIG. 34, the base 14 and the bottom plate 142 form an installation opening 143 for the guide mechanism 41 to move up and down and realize the installation and removal of the guide mechanism 41. The guide assembly 411 includes a guide plate 4111 and a mounting plate 4112. The tool bit moves along the guide plate 4111, and the mounting plate 4112 is substantially perpendicular to the guide plate 4111.

Figure 35:
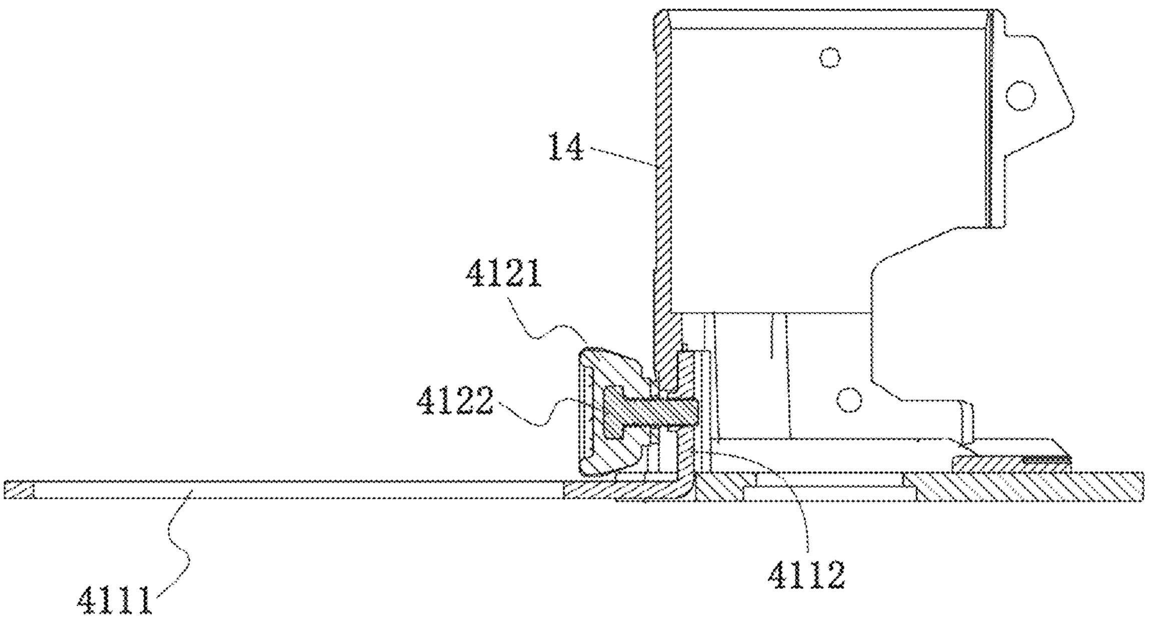
Figure 36:
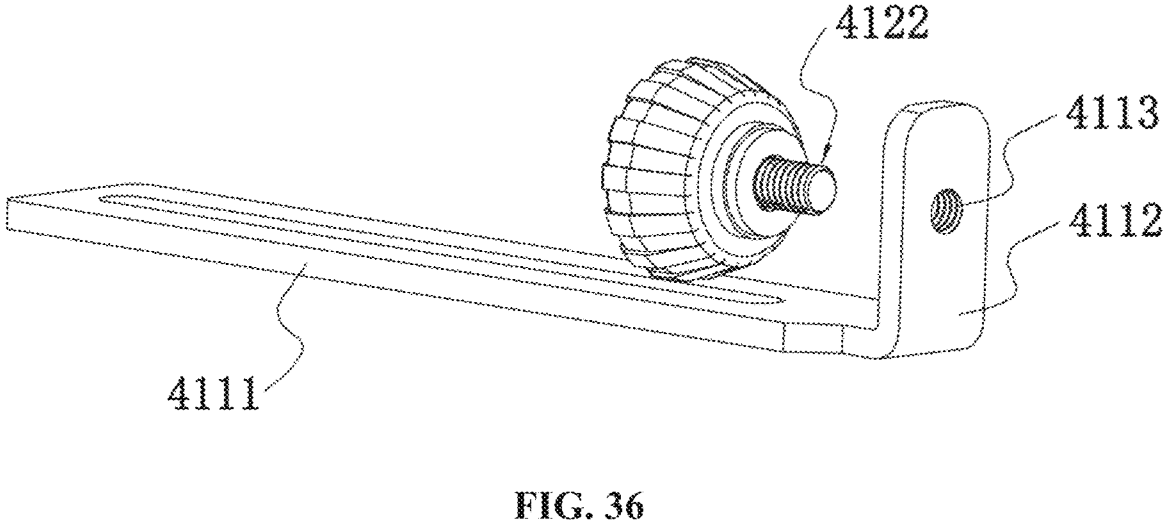

As shown in FIG. 35, the adjustment assembly 412 includes an operating member 4121 for fastening or loosening the guide mechanism 41. The base 14 includes a cylindrical wall. In this example, the mounting plate 4112 is mounted to the inner wall of the base 14. That is to say, when the guide assembly 411 is mounted on the base 14, the guide plate 4111 is substantially perpendicular to the first axis 101, the mounting plate 4112 is substantially parallel to the first axis 101, and the base 14 is at least partially located between the operating member 4121 and the mounting plate 4112. In the prior art, the mounting plate 4112 is usually mounted to the outer wall of the base 14, but the present application moves the mounting plate 4112 to the inner wall of the base 14. The advantage of this setting is that, referring to FIG. 33, when the mounting plate 4112 is located inside the base 14, the gripping bottom 146 of the base 14 will not be blocked by the mounting plate 4112, and fingers can directly rest on the gripping bottom 146 of the base 14. There is no need for user's hand to ride on the mounting plate 4112, which thereby improving the user's gripping experience.

Continuing to refer to FIG. 34 and FIG. 35, the adjustment assembly 412 includes the operating member 4121 and a first bolt 4122, and the rotation of the operating member 4121 drives the first bolt 4122 to rotate. The mounting plate 4112 includes a threaded hole 4113, and the first bolt 4122 can be screwed into the threaded hole 4113 of the mounting plate 4112 to fasten the guide mechanism 41. Similarly, the first bolt 4122 can also be screwed out of the threaded hole 4113 to loosen the guide mechanism 41.

Figure 37:
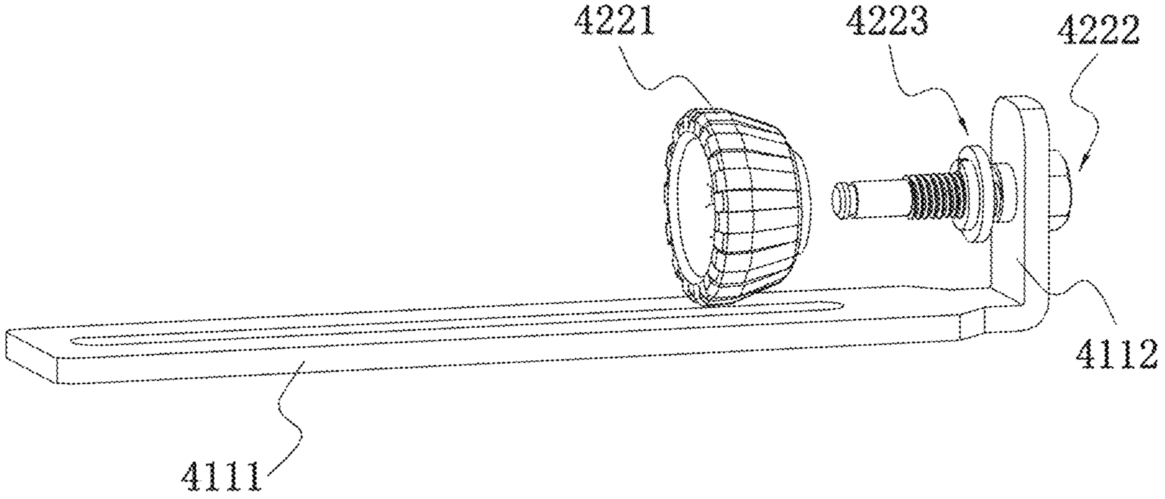
Figure 38:
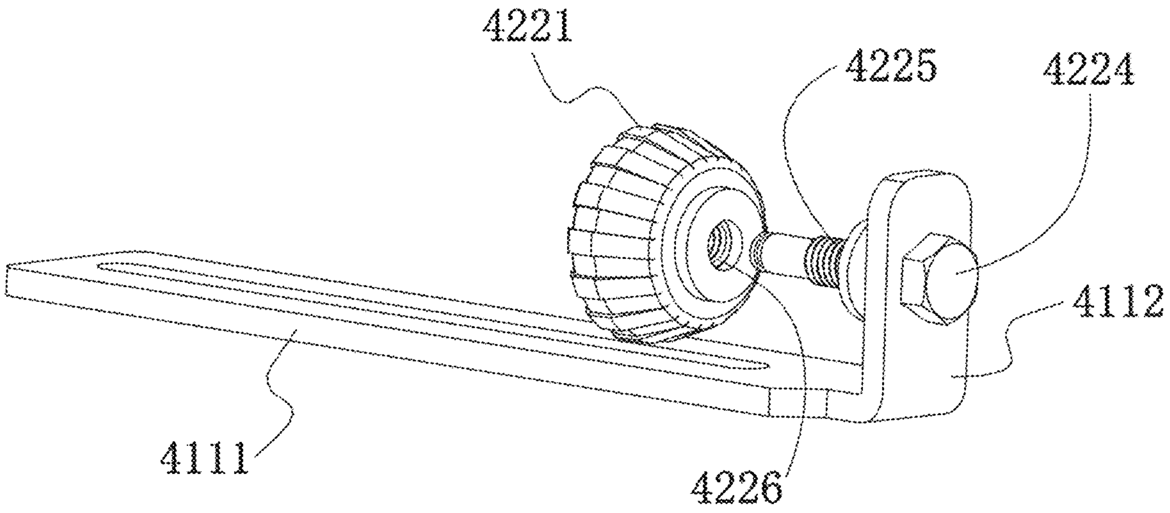

FIGS. 37 and 38 disclose another example of the guide mechanism 41. In this example, a second bolt 4221 is inserted from the side of the mounting plate 4112 away from the guide plate 4111, and a nut 4224 of the second bolt 4222 faces toward the front side of the router 100 relative to a threaded portion 4225. A fixing part 4223 is installed on the threaded part 4225 of the second bolt 4222, and the mounting plate 4112 is fixed between the fixing part 4223 and the nut 4224. In this example, the operating member 4221 has a screw hole 4226, and the screw hole 4226 can engage with the threaded portion 4225, so that the guide mechanism 41 can be fastened or loosened by screwing the operating member 4221 in or out.

What is claimed is:

1. A router, comprising:

a housing provided with an accommodation space, the housing forming or connecting to a grip for a user to hold;

an electric motor; and a drive shaft connected to or formed with the electric motor for outputting power;

wherein the drive shaft rotates about a first axis, the drive shaft has an external thread located on an outer edge of the drive shaft, the external thread is a M14 thread, the drive shaft can be mated with a power output assembly for connecting a tool bit for cutting operations, the power output assembly comprises a chuck and a fastener, the chuck is formed on or connected to the drive shaft, the fastener is threaded with the external thread of the drive shaft, and the tool bit is installed or released to the drive shaft when tightening the fastener to the drive shaft or loosening the fastener from the drive shaft.

2. The router according to claim 1, wherein the external thread has a thread pitch of 0.75 mm.

3. The router according to claim 1, wherein a lower end of the drive shaft forms a receiving opening, the receiving opening has a section having an inclined side wall, the angle between the inclined side wall and the first axis is a first angle $\alpha$, and the first angle $\alpha$ is greater than or equal to 7.5 degrees and less than or equal to 8.5 degrees.

4. The router according to claim 3, wherein the first angle $\alpha$ is 8 degrees.

5. The router according to claim 3, wherein the maximum distance from a bottom end of the receiving opening to the inclined side wall is a first length L1, and the first length L1 is greater than or equal to 17 mm.

6. The router according to claim 3, wherein the inclined side wall forms a minimum first diameter D1 in a direction perpendicular to the first axis, and the first diameter D1 is greater than or equal to 7.5 mm and less than or equal to 8 mm.

7. The router according to claim 3, wherein a lower end of the inclined side wall forms a chamfer, the chamfer is used to make the tool bit easier to insert into the receiving opening, the chamfer forms a maximum second diameter D2 in a direction perpendicular to the first axis, and the second diameter D2 is in the range of (11±0.05) mm.

8. The router according to claim 1, wherein a maximum distance of the external thread along the first axis is a second length L2, and the second length L2 is greater than or equal to 10 mm.

9. The router according to claim 1, further comprising a base used to support the router on a surface of a workpiece to be operated wherein the base forms or is connected with the grip.

10. The router according to claim 1, wherein the housing forms a power supply connection portion for connecting with a battery pack.

11. A router, comprising:

a housing provided with an accommodation space, the housing forming or connecting to a grip for a user to hold;

an electric motor; and a drive shaft connected to or formed with the electric motor for outputting power;

wherein the drive shaft rotates around a first axis, and the drive shaft comprises an adapting portion to connect a chuck conforming to the ER11 size standard, the chuck being used to clamp a tool bit for cutting operations.

12. The router according to claim 11, wherein an external thread is located on an outer edge of the drive shaft, and the external thread is a M14 thread.

13. The router according to claim 12, wherein the external thread has a thread pitch of 0.75 mm.

14. The router according to claim 12, wherein a lower end of the drive shaft forms a receiving opening, the receiving opening has a section having an inclined side wall, the angle between the inclined side wall and the first axis is a first angle $\alpha$, and the first angle $\alpha$ is greater than or equal to 7.5 degrees and less than or equal to 8.5 degrees.

15. The router according to claim 14, wherein the first angle $\alpha$ is 8 degrees.

16. The router according to claim 14, wherein the maximum distance from a bottom end of the receiving opening to the inclined side wall is a first length L1, and the first length L1 is greater than or equal to 17 mm.

17. The router according to claim 14, wherein the inclined side wall forms a minimum first diameter D1 in a direction perpendicular to the first axis, and the first diameter D1 is greater than or equal to 7.5 mm and less than or equal to 8 mm.

18. The router according to claim 14, wherein a lower end of the inclined side wall forms a chamfer, the chamfer is used to make the tool bit easier to insert into the receiving opening, the chamfer forms a maximum second diameter D2 in a direction perpendicular to the first axis, and the second diameter D2 is in the range of (11±0.05) mm.

19. The router according to claim 12, wherein a maximum distance of the external thread along the first axis is a second length L2, and the second length L2 is greater than or equal to 10 mm.

20. The router according to claim 11, further comprising a base used to support the router on a surface of a workpiece to be operated wherein the base forms or is connected with the grip.

* * * * *